US012241606B2

(12) United States Patent
Gong et al.

(10) Patent No.: US 12,241,606 B2
(45) Date of Patent: Mar. 4, 2025

(54) PRIMARY OPTICAL ELEMENT, PRIMARY OPTICAL ASSEMBLY, OPTICAL ASSEMBLY, VEHICLE LAMP LIGHTING DEVICE AND VEHICLE

(71) Applicant: HASCO VISION TECHNOLOGY CO., LTD., Shanghai (CN)

(72) Inventors: Weigang Gong, Shanghai (CN); Zhiping Qiu, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/260,147

(22) PCT Filed: Feb. 5, 2021

(86) PCT No.: PCT/CN2021/075569

§ 371 (c)(1),
(2) Date: Jun. 30, 2023

(87) PCT Pub. No.: WO2022/165758

PCT Pub. Date: Aug. 11, 2022

(65) Prior Publication Data

US 2024/0068635 A1 Feb. 29, 2024

(51) Int. Cl.
*F21S 41/24* (2018.01)
*F21V 14/00* (2018.01)
(Continued)

(52) U.S. Cl.
CPC ............ *F21S 41/24* (2018.01); *F21V 14/006* (2013.01); *F21V 17/10* (2013.01); *F21W 2102/13* (2018.01)

(58) Field of Classification Search
CPC ........ F21S 41/24; F21V 14/006; F21V 17/10; F21W 2102/12
See application file for complete search history.

(56) References Cited

U.S. PATENT DOCUMENTS

2004/0257494 A1* 12/2004 Park .................... G02B 6/0088 349/65
2019/0094507 A1* 3/2019 Mertens .................. F21S 41/26
2020/0003382 A1* 1/2020 Godderidge ............ F21S 41/26

FOREIGN PATENT DOCUMENTS

CN 108397743 A 8/2018
CN 108626677 A 10/2018
(Continued)

OTHER PUBLICATIONS

GB 4599-2007 (GB4599-2007), General Administration of Quality Supervision, Inspection and Quarantine; Standardization Administration of the People's Republic of China "Motor vehicle headlamps equipped with filament lamps", (2007) National Standard of the People's Republic of China.

*Primary Examiner* — Julie A Bannan
(74) *Attorney, Agent, or Firm* — Volpe Koenig

(57) ABSTRACT

A primary optical element, a primary optical assembly, an optical assembly, a vehicle lamp lighting device and a vehicle. The primary optical element comprises a primary optical element main body comprising a light guiding portion and a fusion light-emitting portion which are provided from rear to front, a front end surface of the fusion light-emitting portion is provided as a light-emitting surface, and the light guiding portion comprises a plurality of light guiding columns, the thickness of the fusion light-emitting portion in the up-down direction greater than the thickness of the light guiding portion in the up-down direction, and the fusion light-emitting portion able to fuse light transmitted by the plurality of light guiding columns to the fusion light- (Continued)

emitting portion, and then emit the light by means of the light-emitting surface. The primary optical assembly, the optical assembly, the vehicle lamp lighting device, and the vehicle comprise the optical assembly.

20 Claims, 16 Drawing Sheets

(51) Int. Cl.
*F21V 17/10* (2006.01)
*F21W 102/13* (2018.01)

(56) References Cited

FOREIGN PATENT DOCUMENTS

| | | | | |
|---|---|---|---|---|
| CN | 207962511 | U | 10/2018 | |
| CN | 109477621 | A | 3/2019 | |
| CN | 209876805 | U | 12/2019 | |
| CN | 210740267 | U | 6/2020 | |
| DE | 102016124800 | A1 * | 6/2018 | ............ F21S 41/143 |
| EP | 2306077 | A2 | 4/2011 | |

* cited by examiner

J-J

K-K

PRIMARY OPTICAL ELEMENT, PRIMARY OPTICAL ASSEMBLY, OPTICAL ASSEMBLY, VEHICLE LAMP LIGHTING DEVICE AND VEHICLE

This application is a 35 U.S.C. § 371 national stage of International Application No. PCT/CN2021/075569, which was filed Feb. 5, 2021 and is incorporated herein by reference as if fully set forth.

FIELD OF THE INVENTION

The present disclosure relates to vehicle lamps, in particular to a primary optical element. Besides, the present disclosure further relates to a primary optical assembly including the primary optical element, an optical assembly including the primary optical assembly, a vehicle lamp lighting device and a vehicle that both include the optical assembly.

BACKGROUND OF THE INVENTION

In the technical field of vehicle lamps, a vehicle lamp lighting device is usually used for lighting of an automobile headlamp and has a light source, a primary optical element, a lens or a secondary light-emitting element formed by parts of equivalent structures. The primary optical element is usually made of glass, silica gel or plastics which are transparent materials and can perform primary light distribution (such as focusing and collimating) on light emitted by the light source, so the primary optical element plays a great role in a vehicle lamp lighting effect, and locating and mounting reliability of the primary optical element has a great impact on accuracy of a vehicle lamp light shape and the vehicle lamp lighting effect. Meanwhile, any part provided on the primary optical element has an impact on primary light distribution of light, and too many mounting structures and locating structures have more or less impacts on a light distribution effect of the primary optical element.

In the prior art, a condensing structure is usually provided on a light-entering portion of a primary optical element of a vehicle lamp so as to condense and collimate the light emitted by the light source, a utilization ratio of the light is improved, but the condensing structure is complicated, high in requirement for a manufacturing process, high in machining difficulty and cumbersome in manufacturing procedures. In a low-beam lighting mode, some light does not require a high illuminance as long as a requirement for light shape uniformity is met, and a light-entering portion structure in the primary optical element does not need to be too complicated. Based on the above factors, a light guide bar starts to be used gradually in the vehicle lamp, the light guide bar is in a column shape, one end of the light guide bar is provided with the light source, the other end of the light guide bar is connected with a light-emitting portion, and thus, the light emitted by the light source can be directly condensed and propagated in the low-beam lighting mode.

However, the existing primary optical element including the light guide bar still has defects of poor optical efficiency and optical effect. Besides, with miniaturization and flattening of an appearance of the vehicle lamp, the market has an increasing demand for a small vehicle lamp lighting device, so a requirement for position accuracy between optical parts, such as a vehicle lamp optical element, is higher and higher, however, the primary optical element and other locating structures and limiting structures provided in the prior art hardly effectively guarantee a mounting effect of the primary optical element, especially, it is in lack of an optical element mounting structure capable of applied in the small vehicle lamp lighting device, and consequently, the vehicle lamp lighting device is unsatisfactory in lighting effect and poor in optical efficiency.

SUMMARY OF THE INVENTION

A technical problem to be solved first by the present disclosure is to provide a primary optical element. The primary optical element is high in optical efficiency and enables a formed low-beam light shape to have a good effect.

A technical problem to be solved in a second aspect of the present disclosure is to provide a primary optical assembly. The primary optical assembly is high in optical efficiency and enables a formed low-beam light shape to have a good effect.

A technical problem to be solved in a third aspect of the present disclosure is to provide an optical assembly. The optical assembly is high in optical efficiency and enables a formed low-beam light shape to have a good effect.

A technical problem to be solved in a fourth aspect of the present disclosure is to provide a vehicle lamp lighting device. The vehicle lamp lighting device is high in optical efficiency and enables a formed low-beam light shape to have a good effect.

A technical problem to be solved in a fifth aspect of the present disclosure is to provide a vehicle. The vehicle is high in optical efficiency and enables a formed low-beam light shape to have a good effect.

In order to solve the above technical problems, a first aspect of the present disclosure provides a primary optical element, including a primary optical element main body, wherein the primary optical element main body includes a light guiding portion and a fusion light-emitting portion which are provided from rear to front, a front end surface of the fusion light-emitting portion is provided as a light-emitting surface, the light guiding portion includes a plurality of light guiding columns sequentially arranged in a left-right direction, a thickness of the fusion light-emitting portion in an up-down direction is greater than a thickness of the light guiding portion in the up-down direction, and the fusion light-emitting portion is able to fuse light transmitted by the plurality of light guiding columns to the fusion light-emitting portion, and then emit the light by means of the light-emitting surface.

Preferably, the plurality of light guiding columns include two side light guiding columns and at least one middle light guiding column, the at least one middle light guiding column is sequentially arranged between the two side light guiding columns in the left-right direction, and an outer side surface of each of the side light guiding columns is provided in such way as extending forwards along a straight line and then bending towards an outer side along a curve from rear ends of the side light guiding columns to extend to a rear side of the fusion light-emitting portion.

Further preferably, the middle light guiding column is provided in such way as making a distance between a left side surface and a right side surface increase gradually from rear to front.

Specifically, an included angle formed between the left side surface and the right side surface of the middle light guiding column is 2° to 4°, and an included angle of a gap between the side light guiding column and the middle light guiding column adjacent to the side light guiding column is 5° to 10°.

As a preferable way, the light-emitting surface is provided as a forwards-convex curved surface.

Preferably, a cut-off line structure is formed at a bottom of the light-emitting surface and includes a central cut-off line structure and cut-off line outer side extending structures located on two sides of the central cut-off line structure, and the cut-off line outer side extending structures are smoothly connected with the central cut-off line structure.

Further preferably, the light-emitting surface includes a main light-emitting surface and an auxiliary light-emitting surface located on a lower side of the main light-emitting surface, the auxiliary light-emitting surface is provided in such way as gradually tilting towards lower and back from top to bottom, and the cut-off line structure is provided on the auxiliary light-emitting surface.

Specifically, a transitional surface is provided between the main light-emitting surface and the auxiliary light-emitting surface, and the transitional surface is provided as an arc surface so as to smoothly connect the main light-emitting surface and the auxiliary light-emitting surface.

A second aspect of the present disclosure provides a primary optical assembly, including a primary optical element according to any above technical solution and a primary optical element support used for mounting the primary optical element.

Preferably, the primary optical element support includes a primary optical element main body containing cavity, and the primary optical element support is able to be connected with the primary optical element in an inserted mode, so that a primary optical element main body is mounted in the primary optical element main body containing cavity.

More preferably, the primary optical element further includes a primary optical element mounting portion connected with the primary optical element main body, left and right side surfaces and a top surface of a fusion light-emitting portion are connected with the primary optical element mounting portion, a plate insert hole is formed between a bottom surface of the fusion light-emitting portion and the primary optical element mounting portion, a supporting plate is provided in the primary optical element main body containing cavity, so that in a state that the primary optical element main body is mounted in the primary optical element main body containing cavity, the supporting plate is able to be connected into the plate insert hole in an inserted mode and the fusion light-emitting portion is supported on the supporting plate.

Specifically, clamp blocks are arranged on an outer side of the primary optical element main body containing cavity, and clamp grooves matching the clamp blocks are formed in the primary optical element mounting portion.

More specifically, a strengthening structure is provided at a bottom of the supporting plate.

Typically, a sunlight focusing prevention plate is provided on the primary optical element support.

As a preferable way, a light-emitting surface is provided as a forwards-convex curved surface, a cut-off line structure is formed at a bottom of the light-emitting surface and includes a central cut-off line structure and cut-off line structure outer side extending structures located on two sides of the central cut-off line structure, and the cut-off line structure outer side extending structures are smoothly connected with the central cut-off line structure; and a front end surface of the supporting plate is provided as an inwards-concave curved surface, outer side extending cut-off line structures are provided on two sides of a front end of a top surface of the supporting plate respectively, and the outer side extending cut-off line structures are able to be connected with the cut-off line structure so as to form a combined cut-off line structure.

Preferably, an aluminum-coated layer is provided in a region, between the cut-off line outer side extending structures and the outer side extending cut-off line structures, on the top surface of the supporting plate.

Specifically, a plurality of regular-prismoid-shaped through holes with section perimeters decreasing gradually from front to rear are formed in a rear end of the primary optical element main body containing cavity, an opening of a rear end of each regular-prismoid-shaped through hole is provided as a light guiding column limiting hole able to limit a light guiding column, and the number of the regular-prismoid-shaped through holes is greater than or equal to the number of the light guiding columns.

A third aspect of the present disclosure provides an optical assembly, including the primary optical assembly according to any above technical solution, a secondary optical element and a secondary optical element support used for mounting the secondary optical element.

Preferably, a primary optical element support includes a primary optical element main body containing cavity, and the primary optical element support is able to be connected with a primary optical element in an inserted mode, so that a primary optical element main body is mounted in the primary optical element main body containing cavity to form the primary optical assembly; and a primary optical assembly containing cavity used for containing the primary optical assembly is provided on the secondary optical element support, the secondary optical element is mounted at a front end of the primary optical assembly containing cavity, a locating limiting structure is provided on the primary optical element and the primary optical assembly containing cavity, so as to limit a degree of freedom of the primary optical assembly in a case that the primary optical assembly is provided in the primary optical assembly containing cavity.

More preferably, the locating limiting structure includes limiting cavities located on the primary optical assembly containing cavity and limiting blocks located on the primary optical element, and the limiting cavities match the limiting blocks.

Further preferably, the limiting blocks are located on a left side and a right side of a front end of the primary optical element.

Specifically, upper and lower end surfaces of the limiting blocks form primary optical element upper and lower limiting surfaces, outer side surfaces of the limiting blocks form primary optical element left and right limiting surfaces, and containing cavity upper and lower limiting surfaces corresponding to the primary optical element upper and lower limiting surfaces and containing cavity left and right limiting surfaces corresponding to the primary optical element left and right limiting surfaces are provided on inner walls of the limiting cavities.

Typically, primary optical element forwards-moving limiting surfaces located on upper sides and/or lower sides of the limiting blocks are provided on the front end of the primary optical element, and containing cavity forwards-moving limiting surfaces matching the primary optical element forwards-moving limiting surfaces are provided at a rear end of the primary optical assembly containing cavity.

As a preferable way, the primary optical element further includes a primary optical element mounting portion connected with the primary optical element main body, and the limiting blocks are located at a front end of the primary optical element mounting portion.

Preferably, a guide pin is provided at a rear end of the secondary optical element support, and a guide hole matching the guide pin is formed in the primary optical element support.

A fourth aspect of the present disclosure provides a vehicle lamp lighting device, including a low-beam light source and the optical assembly according to any above technical solution, and the low-beam light source, a primary optical element and a secondary optical element are arranged sequentially from rear to front.

Preferably, the vehicle lamp lighting device further includes a circuit board, the low-beam light source is provided on the circuit board, locating pins and circuit board abutting-joint surfaces able to make contact with the circuit board are provided at a rear end of a primary optical element support, and locating holes matching the locating pins are formed in the circuit board.

More preferably, the vehicle lamp lighting device further includes a heat sink, studs are provided at a rear end of a secondary optical element support, and screw holes matching the studs are formed in the heat sink.

A fifth aspect of the present disclosure provides a vehicle, including the vehicle lamp lighting device according to any above technical solution.

Through the above technical solutions, the light guiding portion of the primary optical element provided by the present disclosure is provided as the plurality of light guiding columns sequentially arranged in the left-right direction, and the thickness of the fusion light-emitting portion in the up-down direction is greater than the thickness of the light guiding portion in the up-down direction. As the thickness of the fusion light-emitting portion is increased, not only can light transmitted by each light guiding column to the fusion light-emitting portion be fused in the fusion light-emitting portion so that light transmitted to the light-emitting surface is uniformly distributed, but also the light emitted from the light-emitting surface can be more diffused, so it is beneficial for light shape softening of a lower portion of an upper boundary of the low-beam light shape, and thus the primary optical element is high in optical efficiency, and enables a formed low-beam light shape to have a good effect.

In preferable implementations of the present disclosure, the outer side surface of each of the side light guiding columns is provided in such way as extending forwards along the straight line and then bending towards the outer side along the curve from the rear ends to extend to the rear side of the fusion light-emitting portion, and outer side outlines of the side light guiding columns gradually bend towards two sides, so that a lighting range of two sides of the low-beam light shape can be widened; the light-emitting surface is provided as the forwards-convex curved surface, so that the emitted light is more condensed and the optical efficiency of the primary optical element can be further improved; the light-emitting surface is provided in a segmented mode, namely, the main light-emitting surface and the auxiliary light-emitting surface, so as to improve optical dispersion; the primary optical element and the primary optical element support are connected in an inserted mode to form the primary optical assembly, so that structural stability during mounting and use of the primary optical element and formed light shape stability can be improved, and thus a structure between parts of the vehicle lamp lighting device is compacter, and position accuracy between the parts is higher; and the locating limiting structure is provided on the primary optical element and the primary optical assembly containing cavity, connection structural stability and relative position accuracy between the primary optical assembly and the secondary optical element support can be improved, thus relative position accuracy between the primary optical element and the secondary optical element is improved, and the effect of the formed low-beam light shape is improved.

Other advantages related to the present disclosure and technical effects of the preferable implementations will be further described in the following detailed description of the embodiments.

Figure 1:
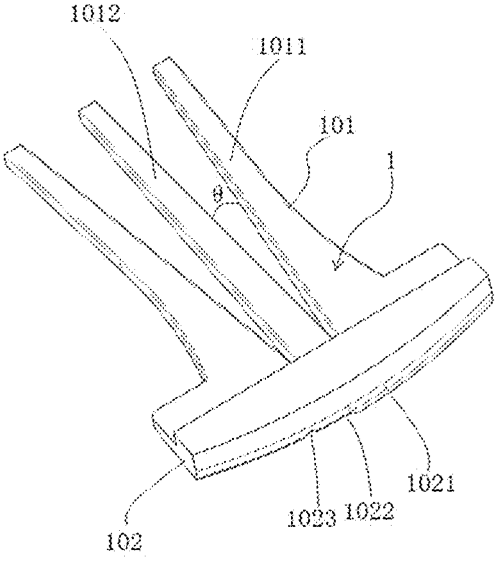
FIG. 1 is a first schematic structural diagram of a specific implementation of a primary optical element in the present disclosure.
Figure 2:
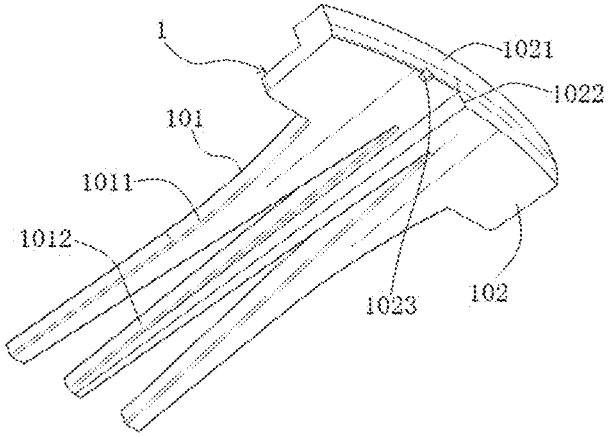
FIG. 2 is a second schematic structural diagram of the primary optical element shown in FIG. 1.
Figure 3:
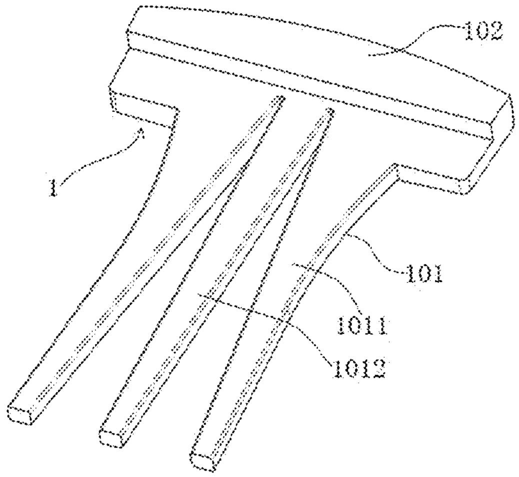
FIG. 3 is a third schematic structural diagram of the primary optical element shown in FIG. 1.
Figure 4:
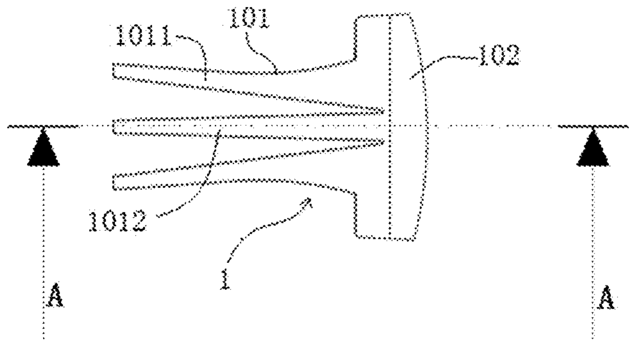
FIG. 4 is a top view of the primary optical element shown in FIG. 1.

Descriptions of reference numerals are as follows:

1—primary optical element;

101—light guiding portion; 1011—side light guiding column; 1012—middle light guiding column; 1013—light-entering surface; 102—fusion light-emitting portion; 1021—light-emitting surface; 1022—central cut-off line structure; 1023-50L dark zone forming structure; 1024—main light-emitting surface; 1025—auxiliary light-emitting surface; 1026—cut-off line outer side extending structure; 103—primary optical element mounting portion; 1031—plate insert hole; 1032—clamp groove; 1033—limiting block; 1034—primary optical element upper and lower limiting surface; 1035—primary optical element left and right limiting surface; 1036—primary optical element forwards-moving limiting surface;

2—primary optical element support;

201—primary optical element main body containing cavity; 2011—clamp block; 2012—primary optical element backwards-moving limiting surface; 202—supporting plate; 2021—outer side extending cut-off line structure; 2022—strengthening structure; 203—regular-prismoid-shaped through hole; 2031—light guiding column limiting hole; 204—locating pin; 205—circuit board abutting-joint surface; 206—guide hole; 207—sunlight focusing prevention plate;

3—secondary optical element;

4—secondary optical element support;

401—primary optical assembly containing cavity; 4011—containing cavity forwards-moving limiting surface; 402—limiting cavity; 4021—containing cavity upper and lower limiting surface; 4022—containing cavity left and right limiting surface; 403—stud; 404—guide pin;

5—circuit board; 501—locating hole;

6—heat sink; 7—low-beam light source; 8—screw;

a-connecting position of central cut-off line structure and outer side extending cut-off line structure; b-bright and dark cut-off line; θ-included angle of gap between side light guiding column and middle light guiding column adjacent thereto.

DETAILED DESCRIPTION OF THE EMBODIMENTS

The specific implementations of the present disclosure are described in detail below with reference to the accompanying drawings. It is to be understood that the specific implementations described here are merely for describing and explaining the present disclosure, and the protection scope of the present disclosure is not limited by the following specific implementations.

In the description of the present disclosure, it is to be noted that unless otherwise specified and limited clearly, terms of “connection” and “contact” are understood in a broad sense, for example, connection may be a fixed connection, or a detachable connection, or an integrated connection; and may be a direct connection, or an indirect connection through an intermediate medium, or may be communication of interiors of two elements or an interaction relationship of the two elements. Specific meanings of the above terms in the present disclosure may be understood by those ordinarily skilled in the art according to specific conditions.

It needs to be understood that position relations indicated by “upper”, “top”, “lower”, “bottom”, “front”, “rear”, “left”, “right” and the like are merely for conveniently describing the present disclosure and simplifying the description. Based on a primary optical element 1, “front” refers to a direction where a light-emitting direction points, and “rear” refers to a direction opposite to “front”; “left” refers to a left side in the light-emitting direction, and “right” refers to a right side in the light-emitting direction, which are the same as a left-side direction and a right-side direction of normal driving of a vehicle; “upper” and “top” refers to an upper portion in the light-emitting direction, and “lower” and “bottom” refer to a lower portion in the light-emitting direction; and the terms are based on direction or position relations shown in the accompanying drawings, and are merely for conveniently describing the present disclosure and simplifying the description, but not for indicating or implying that an indicated device or element necessarily has a specific direction, and is necessarily constructed and operated in the specific direction, thereby being not understood as a limitation on the present disclosure. In the present disclosure, a fusion action of the fusion light-emitting portion 102 refers to mutually fusing light transmitted to the fusion light-emitting portion 102 and then transmitting the light to the light-emitting surface 1021.

A first aspect of the present disclosure provides a primary optical element, referring to FIG. 1 to FIG. 10, including a primary optical element main body. The primary optical element main body includes a light guiding portion 101 and a fusion light-emitting portion 102 which are provided from rear to front, a front end surface of the fusion light-emitting portion 102 is provided as a light-emitting surface 1021, and the light guiding portion 101 includes a plurality of light guiding columns sequentially arranged in a left-right direction, a thickness of the fusion light-emitting portion 102 in an up-down direction is greater than a thickness of the light guiding portion 101 in the up-down direction, and the fusion light-emitting portion 102 is able to fuse light transmitted by the plurality of light guiding columns to the fusion light-emitting portion 102, and then emit the light by means of the light-emitting surface 1021.

In the present disclosure, the primary optical element 1 may be made of a transparent material such as silica gel, PC and PMMA, preferably, made of the silica gel, so the primary optical element 1 has effects of being resistant to high temperature and high in transmittance.

In the primary optical element 1 provided by the present disclosure, referring to FIG. 9, a rear end surface of each light guiding column forms a light-entering surface 1013, when applied to a vehicle lamp lighting device, a corresponding light source (namely, a low-beam light source 7 below) is provided at a rear end of each light-entering surface 1013, and light emitted by each low-beam light source 7 enters the light guiding column through the corresponding light-entering surface 1013, and is transmitted into the fusion light-emitting portion 102 through the light guiding column. As the thickness of the fusion light-emitting portion 102 is increased, not only can light transmitted by each light guiding column to the fusion light-emitting portion 102 be fused in the fusion light-emitting portion 102 so that light transmitted to the light-emitting surface 1021 is uniformly distributed, but also the light emitted from the light-emitting surface 1021 can be more diffused, so it is beneficial for light shape softening of a lower portion of an upper boundary of a low-beam light shape, and thus the primary optical element 1 is high in optical efficiency, and enables a formed low-beam light shape to have a good effect.

In a first preferable embodiment of the primary optical element 1 of the present disclosure, referring to FIG. 1 to FIG. 7, the plurality of light guiding columns include two side light guiding columns 1011 and at least one middle light guiding column 1012, the at least one middle light guiding column 1012 is sequentially arranged between the two side light guiding columns 1011 in the left-right direction, and an outer side surface of each of the side light guiding columns 1011 is provided in such way as extending forwards along a straight line and then bending towards an outer side along a curve from rear ends of the side light guiding columns 1011 to extend to a rear side of the fusion light-emitting portion 102. The outer side surface of the side light guiding column 1011 specifically refer to side surfaces of the side light guiding column 1011 away from the middle light guiding column 1012, for example, the outer side surface of the side light guiding column 1011 on a left side is a left side surface of this side light guiding column 1011. The plurality of light guiding columns are sequentially arranged in the left-right direction, so that the primary optical element 1 can meet a structural design requirement for miniaturization and flattening of an appearance of a vehicle lamp, meanwhile, the outer side surface of the side light guiding column 1011 is provided in such way as extending forwards along the straight line and then bending towards the outer side along the curve from the rear ends to extend to the rear side of the fusion light-emitting portion 102, so that outer side outlines of the side light guiding columns 1011 bend gradually towards two sides, and thus a lighting range of two sides of the low-beam light shape can be widened, and effects of the light shape are improved.

In some preferable embodiments of the middle light guiding column 1012 of the present disclosure, the middle light guiding column 1012 is provided in such way as making a distance between a left side surface and a right side surface increase gradually from rear to front, so that a light guiding column gap can be formed between the middle light guiding column 1012 and the light guiding column adjacent thereto, and meanwhile, light entering the light-entering surface 1013 of the middle light guiding column 1012 can be totally reflected therein and forwards transmitted as much as possible. At the moment, inner side surfaces of the side light guiding columns 1011 may also be provided as tilting from rear to front, so that wedge-shaped light guiding column gaps are formed between the adjacent middle light guiding columns 1012 and between the side light guiding column 1011 and the middle light guiding column 1012 adjacent to this side light guiding column 1011, and thus a situation that the optical efficiency is reduced due to light escape among each light guiding columns is prevented.

In a preferable case, an included angle formed by the left side surface and the right side surface of the middle light guiding column 1012 is 2° to 4°, an included angle θ of a gap between the side light guiding column 1011 and the middle light guiding column 1012 adjacent to this side light guiding column 1011, namely, an angle of the light guiding column gap between the side light guiding column 1011 and the middle light guiding column 1012 adjacent thereto, is 5° to 10°, so efficiency of total reflection, in the corresponding light guiding column, of light entering the side light guiding columns 1011 and the middle light guiding column 1012 is improved, and the optical efficiency of the light in the primary optical element 1 is further improved.

In a second preferable embodiment of the primary optical element 1 of the present disclosure, the light-emitting surface 1021 is provided as a forwards-convex curved surface, so that the emitted light is more condensed, and the optical efficiency of the primary optical element 1 is improved.

In a preferable case, referring to FIG. 1, FIG. 2, FIG. 21 and FIG. 22, a cut-off line structure is formed at a bottom of the light-emitting surface 1021. The cut-off line structure includes a central cut-off line structure 1022 and cut-off line outer side extending structures 1026 located on two sides of the central cut-off line structure 1022, the cut-off line outer side extending structures 1026 are smoothly connected with the central cut-off line structure 1022, so that a bright and dark cut-off line b can exist on a light shape formed by the light emitted from the light-emitting surface 1021 and then projected by a secondary optical element 3 (such as a lens) below, and a corresponding structural design may be made according to a requirement of the light shape. Specifically, when the cut-off line structure is formed at the bottom of the light-emitting surface 1021, the central cut-off line structure 1022 is used for forming an upper boundary of a main low-beam light shape at a middle of the low-beam light shape, namely, a part of the middle of the bright and dark cut-off line b of the light shape, the corresponding formed upper boundary is a cut-off line shape with a height difference on two sides being connected through an oblique line.

Further preferably, a pit is formed in a bottom of a front end of the fusion light-emitting portion 102 and serves as a 50L dark zone forming structure 1023, light entering a 50L dark zone is reduced, brightness of the 50L dark zone is controlled, and thus the low-beam light shape meets a requirement of laws and regulations.

In the present disclosure, the light guiding portion 101 may be provided to connect with the fusion light-emitting portion 102 at a middle area in the up-down direction at a rear end of the fusion light-emitting portion 102, or may also be provided in such way as making a bottom surface of the light guiding portion 101 flush with a bottom surface of the fusion light-emitting portion 102, so that when the cut-off line structure is formed at the bottom of the light-emitting surface 1021, a shape and a position of the bright and dark cut-off line b on the formed low-beam light shape are guaranteed.

Figure 5:
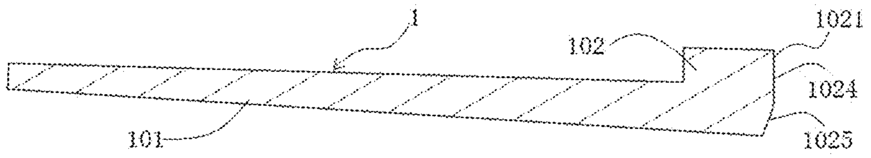
FIG. 5 is a sectional view of A-A in FIG. 4.
Figure 6:
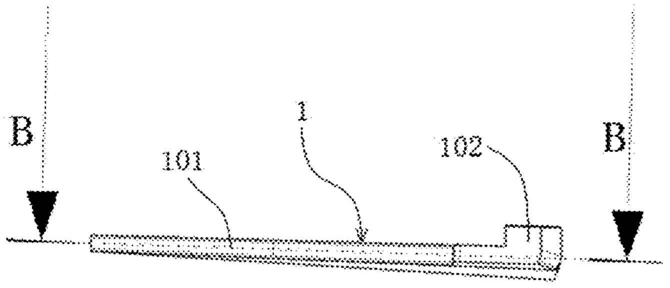
FIG. 6 is a side view of the primary optical element shown in FIG. 1.
Figure 7:
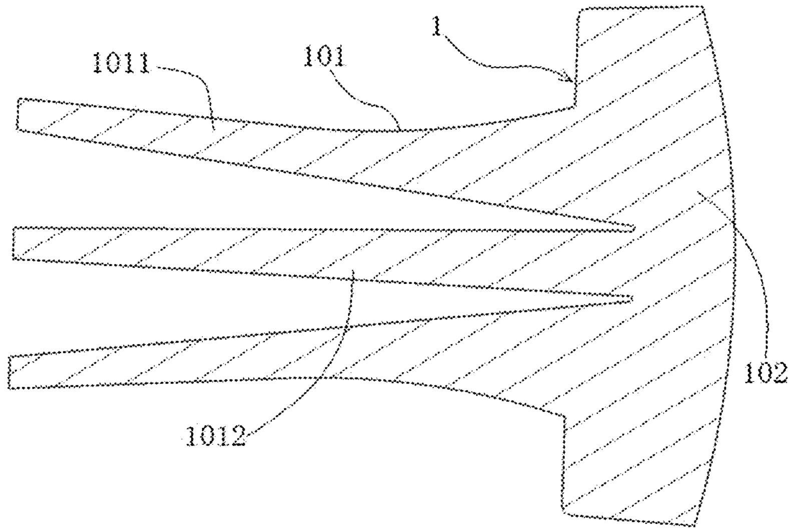
FIG. 7 is a sectional view of B-B in FIG. 6.

When the cut-off line structure is formed at the bottom of the light-emitting surface 1021, in order to improve a optical dispersion phenomenon at the bright and dark cut-off line b and improve visual feeling of a driver, in some preferable embodiments of the light-emitting surface 1021 in the present disclosure, referring to FIG. 5, the light-emitting surface 1021 includes a main light-emitting surface 1024 and an auxiliary light-emitting surface 1025 located on a lower side of the main light-emitting surface 1024, the auxiliary light-emitting surface 1025 is provided as gradually tilting towards lower and back from top to bottom, and the cut-off line structure is provided on the auxiliary light-emitting surface 1025. At the moment, the auxiliary light-emitting surface 1025 can make the light passing through the cut-off line structure tilt towards upper and front to enter the secondary optical element 3, and this part of light may be prevented from being emitted from a lower half portion of the secondary optical element 3 as much as possible, so that a color of the formed bright and dark cut-off line b is improved and the visual feeling of the driver is improved. In a preferable case, a transitional surface is provided between the main light-emitting surface 1024 and the auxiliary light-emitting surface 1025, the transitional surface is preferably provided as an arc surface, so as to smoothly connect the main light-emitting surface 1024 and the auxiliary light-emitting surface 1025.

As a relatively preferable specific implementation structure of the primary optical element 1 in the present disclosure, the primary optical element 1 includes the primary optical element main body, the primary optical element main body includes the light guiding portion 101 and the fusion light-emitting portion 102 provided from rear to front, the thickness of the fusion light-emitting portion 102 in the up-down direction is greater than the thickness of the light guiding portion 101 in the up-down direction, the front end surface of the fusion light-emitting portion 102 is provided as the light-emitting surface 1021, the light guiding portion 101 includes three light guiding columns sequentially arranged in the left-right direction, the three light guiding columns are the two side light guiding columns 1011 and one middle light guiding column 1012, rear end surfaces of the side light guiding columns 1011 and the middle light guiding column 1012 form the light-entering surfaces 1013, the outer side surface of each of the side light guiding columns 1011 is provided in such way as extending forwards along the straight line and then bending towards the outer side along the curve from the rear ends of the side light guiding columns 1011 to extend to the rear side of the fusion light-emitting portion 102, the distance between the left side surface and the right side surface of the middle light guiding column 1012 increases gradually from rear to front, the included angle of 2° to 4° is formed, the angle of the light guiding column gap between the side light guiding column 1011 and the middle light guiding column 1012 is 5° to 10°, the light-emitting surface 1021 is provided as the forwards-convex curved surface and includes the main light-emitting surface 1024 and the auxiliary light-emitting surface 1025 located on the lower side of the main light-emitting surface 1024, the auxiliary light-emitting surface 1025 is provided as gradually tilting towards lower and back from top to bottom, the cut-off line structure is provided at the bottom of the auxiliary light-emitting surface 1025 and includes the central cut-off line structure 1022 and the cut-off line outer side extending structures 1026 located on the two sides of the central cut-off line structure 1022, the cut-off line outer side extending structures 1026 are smoothly connected with the central cut-off line structure 1022, and the 50L dark zone forming structure 1023 is provided at the bottom of the front end of the fusion light-emitting portion 102.

Light emitted by the low-beam light source 7 corresponding to the above primary optical element 1 enters the side light guiding columns 1011 and the middle light guiding column 1012 through the corresponding light-entering surface 1013, and is transmitted into the fusion light-emitting portion 102 through the light guiding columns, the fusion light-emitting portion 102 causes the light transmitted by each light guiding column to the fusion light-emitting portion 102 to be fused in the fusion light-emitting portion 102 and then emitted from the light-emitting surface 1021, meanwhile, under an action of the cut-off line structure, the light emitted from the light-emitting surface 1021 forms the bright and dark cut-off line, and the 50L dark zone forming structure 1023 can effectively control the brightness of the 50L dark zone, so that the formed low-beam light shape meets the requirement of laws and regulations.

When the primary optical element 1 of the present disclosure is mounted in a vehicle lamp lighting device, a conventional mounting mode may be adopted, the primary optical element is connected and fixed to other parts in the vehicle lamp lighting device, preferably, the primary optical element 1 is mounted on the primary optical element support 2, and at the moment, the primary optical element 1 and the primary optical element support 2 form the primary optical assembly.

A second aspect of the present disclosure provides a primary optical element support 2, used for mounting a primary optical element 1. Referring to FIG. 11 to FIG. 15, the primary optical element support 2 includes a primary optical element main body containing cavity 201, the primary optical element support 2 is able to be connected with the primary optical element 1 in an inserted mode, and thus the primary optical element 1 or a primary optical element main body is mounted in the primary optical element main body containing cavity 201 to form the primary optical assembly. At the moment, the primary optical element 1 may be of various primary optical element structures, such as may be a condenser, and may also be an optical element structure with a light-entering portion, a transmission portion and a light-emitting portion. When the primary optical element 1 is of the above structures in the present disclosure, when the primary optical element and the primary optical element support 2 are mounted, the primary optical element main body is mounted in the primary optical element main body containing cavity 201.

In a first preferable embodiment of the primary optical element support 2 in the present disclosure, a supporting plate 202 is provided in the primary optical element main body containing cavity 201, so that in a state that the primary optical element main body is mounted in the primary optical element main body containing cavity 201, a bottom of a fusion light-emitting portion 102 is supported on the supporting plate 202. A structure of the primary optical assembly formed by inserted connection of the primary optical element 1 and the primary optical element support 2 is firmer, so that structural stability during mounting and use of the primary optical element 1 and formed light shape stability are improved, and thus a structure between parts of the vehicle lamp lighting device is more compact and position accuracy between the parts is higher.

In a preferable case, based on that the primary optical element 1 includes the primary optical element main body, and the primary optical element main body includes a light guiding portion 101 with a plurality of light guiding columns and the fusion light-emitting portion 102 from rear to front, referring to FIG. 11 to FIG. 15, a plurality of regular-prismoid-shaped through holes 203 with section perimeters decreasing gradually from front to rear are formed in a rear end of the primary optical element main body containing cavity 201, an opening of a rear end of each regular-prismoid-shaped through hole 203 is provided as a light guiding column limiting hole 2031 able to limit the light guiding column, and the light guiding columns can be inserted into the corresponding light guiding column limiting holes 2031 respectively. When the primary optical element support 2 and the primary optical element 1 are connected in an inserted mode, not only can front ends support the primary optical element 1 by the supporting plate 202, but also the light guiding columns can be inserted into the light guiding column limiting holes 2031 from the corresponding regular-prismoid-shaped through holes 203 to be limited, position accuracy of rear ends of the light guiding column relative to a light source is guaranteed, mounting position accuracy and reliability of the primary optical element 1 can be further improved, the optical efficiency is improved, and a lighting effect of a vehicle lamp is improved. It may be understood that the primary optical element support 2 provided by the present disclosure can be not only applied to the primary optical element 1 in the present disclosure, but also applied to various other primary optical element structures each having the light guiding portion 101 and the fusion light-emitting portion 102.

In the present disclosure, due to structural arrangement of the regular-prismoid-shaped through holes 203, when the primary optical element main body is connected into the primary optical element main body containing cavity 201 in an inserted mode, the light guiding columns are conveniently inserted into the light guiding column limiting holes 2031 from the corresponding regular-prismoid-shaped through holes 203 to be limited. In a preferable case, the number of the regular-prismoid-shaped through holes 203 is greater than or equal to the number of the light guiding columns.

In a using process of the vehicle lamp, a secondary optical element 3 is usually provided, sunlight shines on the secondary optical element 3 and forms a high temperature by focusing in the vehicle lamp, most of parts in the vehicle lamp are made of a plastic material and may have a phenomenon of melting in the high temperature, consequently, the vehicle lamp may be damaged, and a certain potential safety hazard further exists. Therefore, a sunlight focusing prevention plate 207 may be provided in a region in the vehicle lamp where focusing easily occurs, so that heat conducted to the parts prone to being molten is reduced, a vehicle lamp damage hazard is reduced, and safety is improved. As a second preferable embodiment of the primary optical element support 2 in the present disclosure, the sunlight focusing prevention plate 207 is provided on the primary optical element support 2, at the moment, the sunlight focusing prevention plate 207 is preferably made of a metal material, for example, made of an ADC material, which is light, economical and good in heat conduction property.

Figure 12:
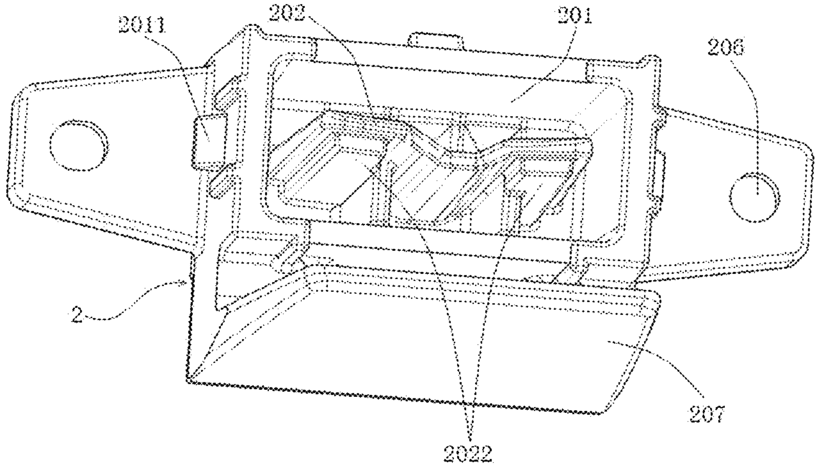
FIG. 12 is a second schematic structural diagram of the primary optical element support shown in FIG. 11.
Figure 13:
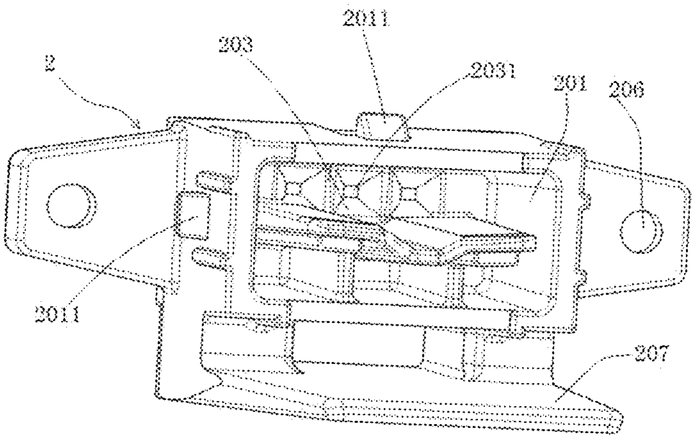
FIG. 13 is a third schematic structural diagram of the primary optical element support shown in FIG. 11.
Figure 14:
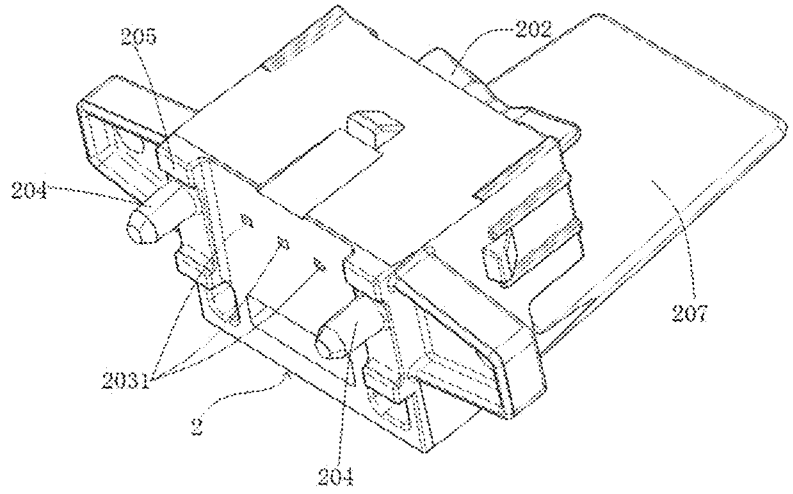
FIG. 14 is a fourth schematic structural diagram of the primary optical element support shown in FIG. 11.
Figure 15:
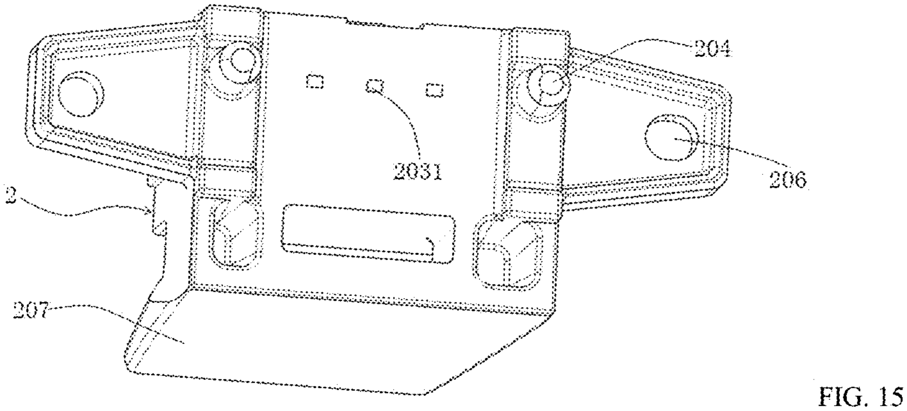
FIG. 15 is a fifth schematic structural diagram of the primary optical element support shown in FIG. 11.
Figure 16:
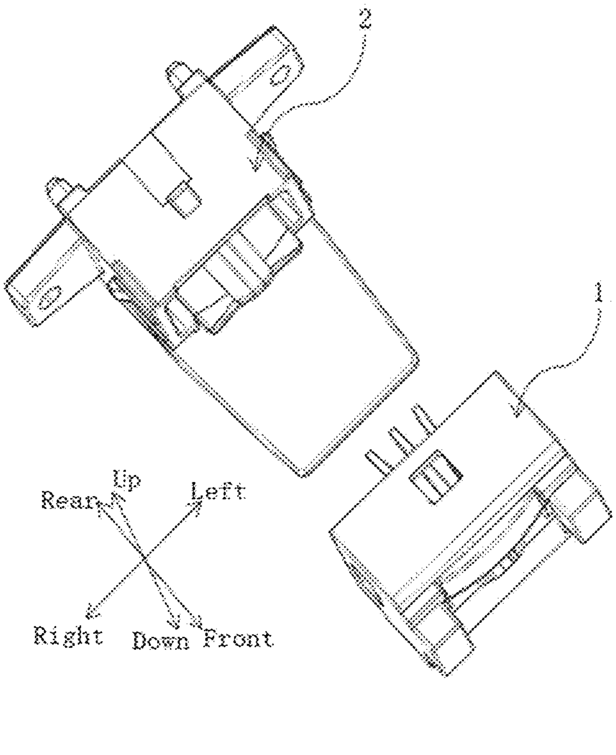
FIG. 16 is a schematic diagram of mounting of the primary optical element shown in FIG. 8 and the primary optical element support shown in FIG. 11.

Further preferably, referring to FIG. 12, a strengthening structure 2022 is provided at a bottom of the supporting plate 202, so as to strengthen structural strength of the supporting plate 202, and thus supporting stability for the fusion light-emitting portion 102 is improved.

As a relatively preferable specific implementation structure of the primary optical element support 2 in the present disclosure, the primary optical element support 2 is applied to the primary optical element 1 including the light guiding portion 101 and the fusion light-emitting portion 102, the light guiding portion 101 has the plurality of light guiding columns, the primary optical element support 2 includes the primary optical element main body containing cavity 201 used for inserted connection of the primary optical element main body and the supporting plate 202 located in the primary optical element main body containing cavity 201, the plurality of regular-prismoid-shaped through holes 203 with section perimeters decreasing gradually from front to rear are formed in the rear end of the primary optical element main body containing cavity 201, the opening of the rear end of each regular-prismoid-shaped through hole 203 is provided as the light guiding column limiting hole 2031 able to limit the light guiding column, and the number of the regular-prismoid-shaped through holes 203 is greater than or equal to the number of the light guiding columns, the sunlight focusing prevention plate 207 is provided on the primary optical element support 2, clamp blocks 2011 are provided on an outer side of the primary optical element main body containing cavity 201, a primary optical element backwards-moving limiting surface 2012 is formed at a front end of the primary optical element main body containing cavity 201, and the strengthening structure 2022 is provided at the bottom of the supporting plate 202.

The corresponding primary optical element main body can be mounted in the primary optical element main body containing cavity 201 through the above primary optical element support 2, so that the fusion light-emitting portion 102 at a front end of the primary optical element 1 is supported on the supporting plate 202, the rear ends of the light guiding columns are inserted into the light guiding column limiting holes 2031 to be limited, thus mounting structural stability of the primary optical element 1 is good, position accuracy thereof is high, the optical efficiency is improved, and the lighting effect of the vehicle lamp is improved.

A third aspect of the present disclosure provides a primary optical assembly, including the primary optical element 1 described in any above technical solution and the primary optical element support 2 used for mounting the primary optical element 1. When the primary optical element 1 is mounted by means of the primary optical element support 2, the primary optical element support 2 may adopt a mounting support in the prior art, and in order to further improve structural stability during mounting and use of the primary optical element 1 and formed light shape stability, the primary optical element support 2 preferably adopts the primary optical element support 2 described in any above technical solution in the present disclosure.

Figure 8:
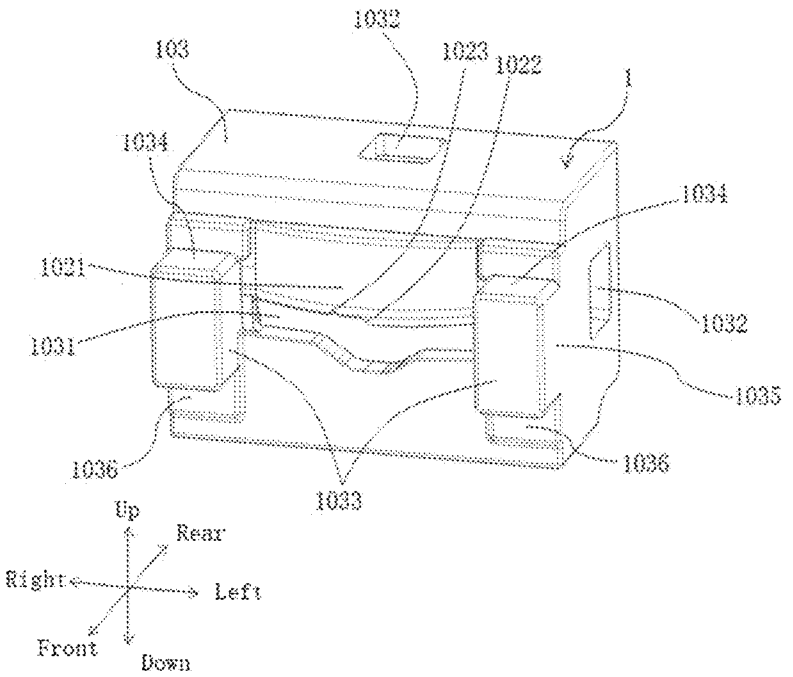
FIG. 8 is a first schematic structural diagram of another specific implementation of a primary optical element in the present disclosure.
Figure 9:
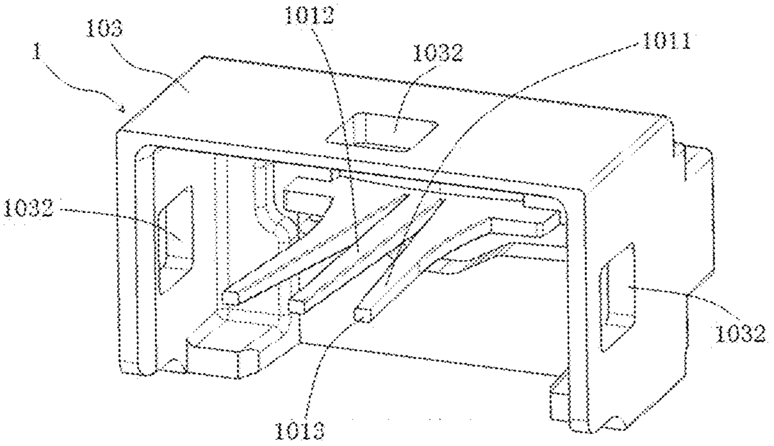
FIG. 9 is a second schematic structural diagram of the primary optical element shown in FIG. 8.
Figure 10:
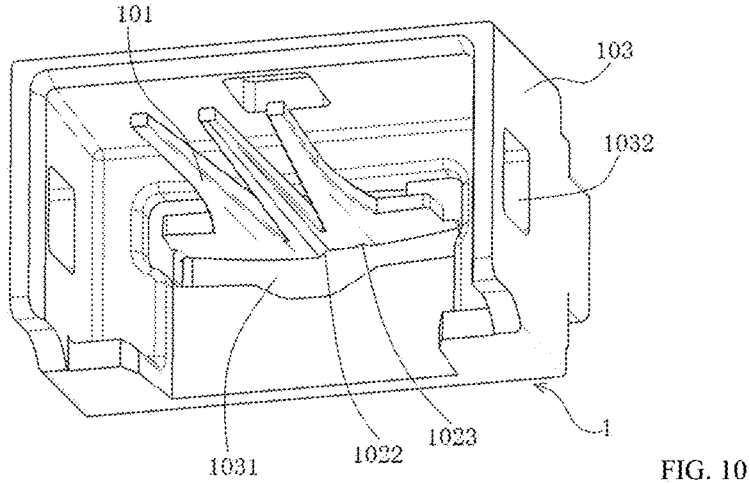
FIG. 10 is a third schematic structural diagram of the primary optical element shown in FIG. 8.
Figure 11:
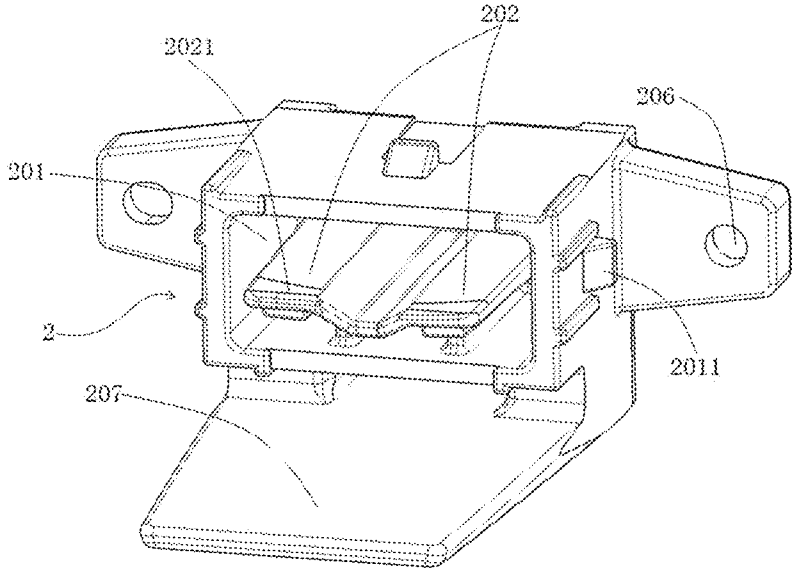
FIG. 11 is a first schematic structural diagram of a specific implementation of a primary optical element support in the present disclosure.

In order to conveniently mount and connect the primary optical element 1 and the primary optical element support 2, as a first preferable embodiment of the primary optical assembly in the present disclosure, referring to FIG. 16 to FIG. 30, with reference to FIG. 8 to FIG. 10, the primary optical element 1 further includes a primary optical element mounting portion 103 connected with the primary optical element main body, left and right side surfaces and a top surface of a fusion light-emitting portion 102 are connected with the primary optical element mounting portion 103, a plate insert hole 1031 is formed between a bottom surface of the fusion light-emitting portion and the primary optical element mounting portion 103, with reference to FIG. 11 to FIG. 15, a supporting plate 202 is provided in a primary optical element main body containing cavity 201, the supporting plate 202 is able to be connected into the plate insert hole 1031 in an inserted mode, and thus the fusion light-emitting portion 102 is supported on the supporting plate 202. When the primary optical element main body is inserted into the primary optical element main body containing cavity 201 from a front side of the primary optical element support 2, correspondingly, the supporting plate 202 is connected into the plate insert hole 1031 in an inserted mode, the fusion light-emitting portion 102 is supported on the supporting plate 202, mounting and connection of the primary optical element 1 and the primary optical element support 2 is firmer, and thus optical stability of the primary optical element 1 is improved.

It may be understood that in the primary optical assembly of the present disclosure, the above mounting and connection mode of the primary optical element 1 and the primary optical element support 2 may be applied to the primary optical element 1 and/or the primary optical element support 2 of various structures, which is not limited to the structural form in the present disclosure. Specifically, the primary optical assembly may include the primary optical element 1 and the primary optical element support 2 used for mounting the primary optical element 1, the primary optical element 1 includes the primary optical element main body and the primary optical element mounting portion 103 connected with the primary optical element main body, the primary optical element main body includes the light guiding portion 101 and the light-emitting portion provided from rear to front, a front end surface of the light-emitting portion is provided as a light-emitting surface 1021, the left and right side surfaces and the top surface of the light-emitting portion are connected with the primary optical element mounting portion 103, the plate insert hole 1031 is formed between the bottom surface of the light-emitting portion and the primary optical element mounting portion 103, the primary optical element support 2 includes the primary optical element main body containing cavity 201 used for containing the primary optical element main body, the supporting plate 202 is provided in a primary optical element main body containing cavity 201, so that the supporting plate 202 is able to be connected into the plate insert hole 1031 in an inserted mode in a state that the primary optical element main body is mounted in the primary optical element main body containing cavity 201, and the light-emitting portion is supported on the supporting plate 202. At the moment, connection of the primary optical element 1 and the primary optical element support 2 can achieve firm mounting and fixing of the both, and optical stability of the primary optical element 1 is improved. Thus, preferable structural forms of the following plate insert hole 1031, the supporting plate 202, the primary optical element main body containing cavity 201 and the primary optical element mounting portion 103 are also suitable for the primary optical assembly.

Figure 17:
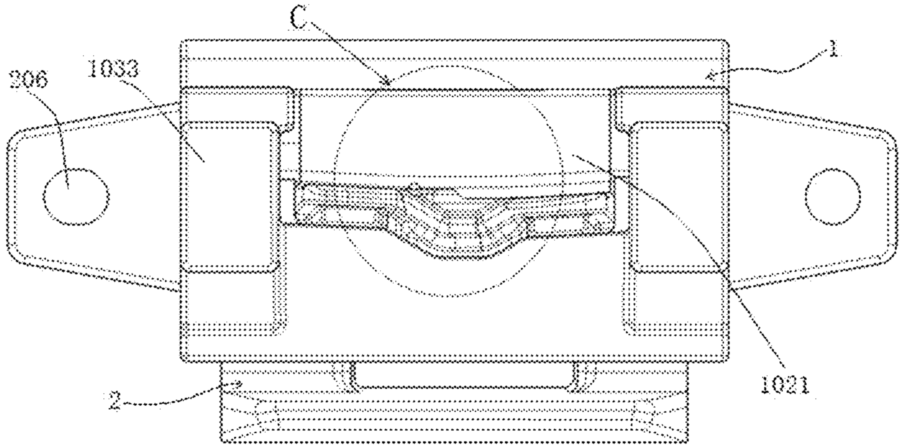
FIG. 17 is a first front view after mounting of the primary optical element shown in FIG. 8 and the primary optical element support shown in FIG. 11.
Figure 18:
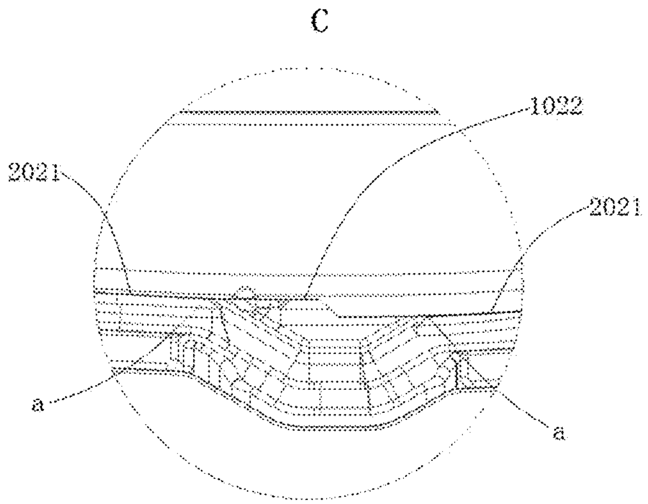
FIG. 18 is a partial enlarged view of a position C in FIG. 17.
Figure 19:
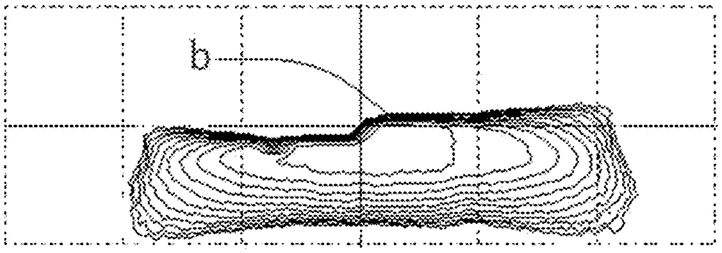
FIG. 19 is a diagram of a low-beam light shape when outer side extending cut-off line structures are not provided on a supporting plate of a primary optical element support.

In the present disclosure, referring to FIG. 17 and FIG. 18, a lower end of the plate insert hole 1031 is provided as a supporting plate contact surface which makes contact with a bottom surface of the supporting plate 202, and a structure of the supporting plate contact surface is designed as being adapted to the bottom surface of the supporting plate 202. For example, the supporting plate 202 is designed as a structure with a low middle and two high sides, correspondingly, the supporting plate contact surface is also designed as a structure with a low middle and two high sides, so that an inserted connection structure of the supporting plate 202 and the plate insert hole 1031 is more stable.

In a preferable case, clamp blocks 2011 are arranged on an outer side of the primary optical element main body containing cavity 201, and clamp grooves 1032 matching the clamp blocks 2011 are formed in the primary optical element mounting portion 103. Through matching of the clamp blocks 2011 and the clamp grooves 1032, the primary optical element 1 is limited from moving forwards relative to the primary optical element support 2, and is not prone to generating displacement relative to the primary optical element support 2. Correspondingly, referring to FIG. 26 and FIG. 27, a primary optical element backwards-moving limiting surface 2012 is formed at a front end of the primary optical element main body containing cavity 201, and is in abutting joint with an inner end surface of the primary optical element mounting portion 103, so as to limit the primary optical element 1 from moving backwards relative to the primary optical element support 2. The clamp grooves 1032 may be specifically provided in such way as being distributed in each side wall of the primary optical element mounting portion 103, the corresponding clamp blocks 2011 are provided on the outer side of the primary optical element main body containing cavity 201, and thus structural stability after mounting of the primary optical element 1 and the primary optical element support 2 is improved.

Figure 20:
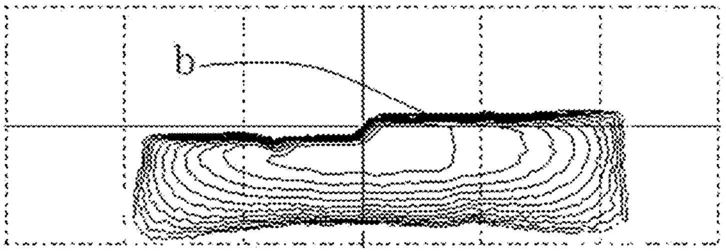
FIG. 20 is a diagram of a low-beam light shape when outer side extending cut-off line structures are provided on a supporting plate of a primary optical element support.
Figure 21:
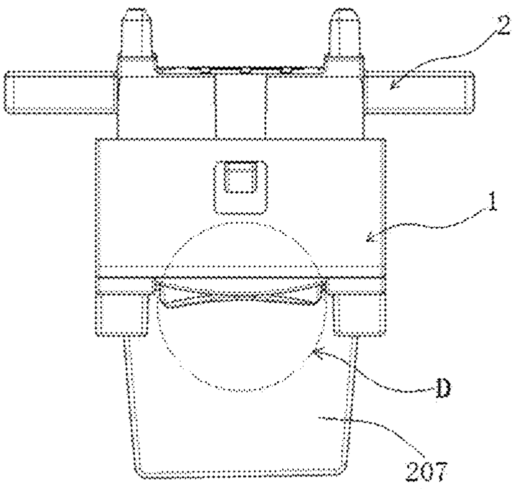
FIG. 21 is a first top view after mounting of the primary optical element shown in FIG. 8 and the primary optical element support shown in FIG. 11.
Figure 22:
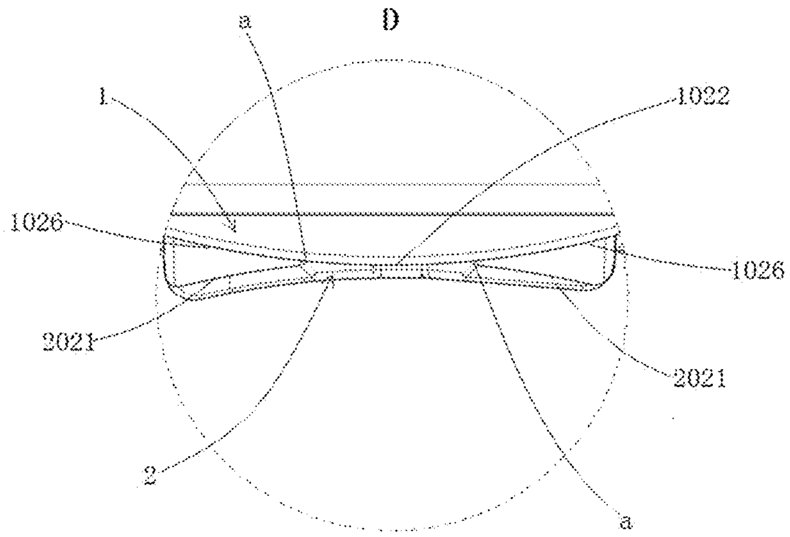
FIG. 22 is a partial enlarged view of a position D in FIG. 21.
Figure 23:
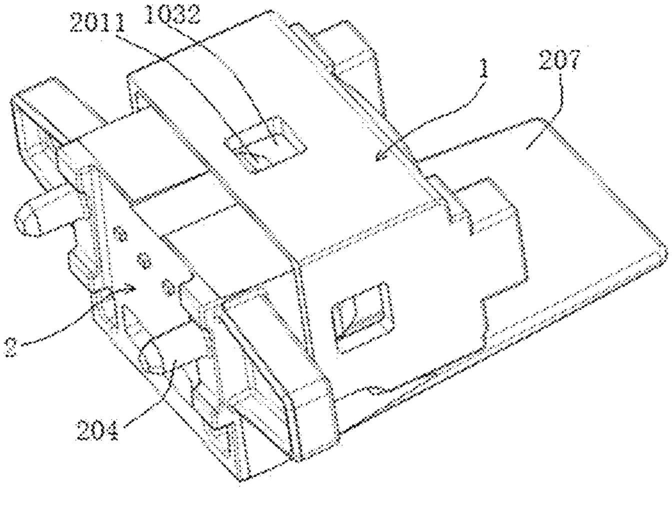
FIG. 23 is a first schematic structural diagram after mounting of the primary optical element shown in FIG. 8 and the primary optical element support shown in FIG. 11.
Figure 24:
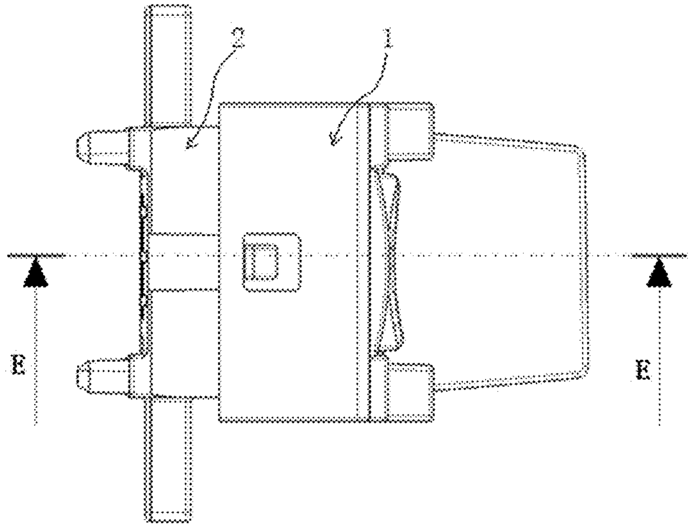
FIG. 24 is a second top view after mounting of the primary optical element shown in FIG. 8 and the primary optical element support shown in FIG. 11.
Figure 25:
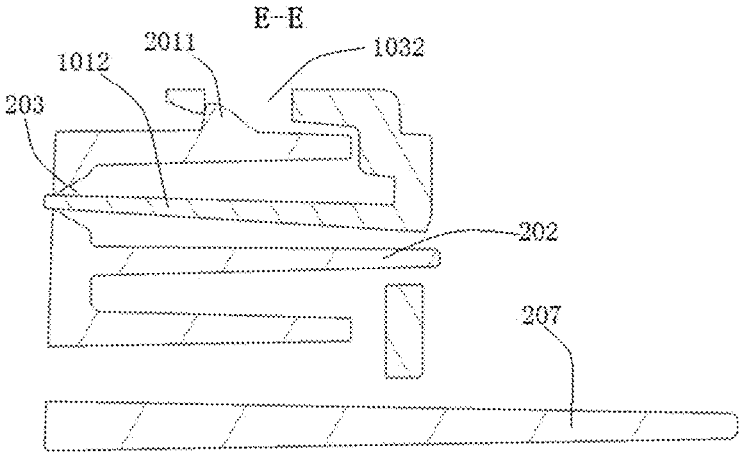
FIG. 25 is a sectional view of E-E in FIG. 24.
Figure 26:
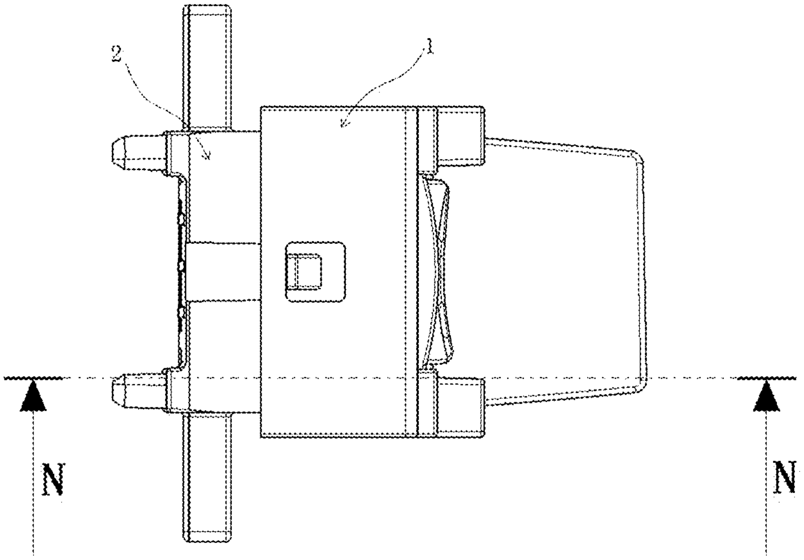
FIG. 26 is a third top view after mounting of the primary optical element shown in FIG. 8 and the primary optical element support shown in FIG. 11.
Figure 27:
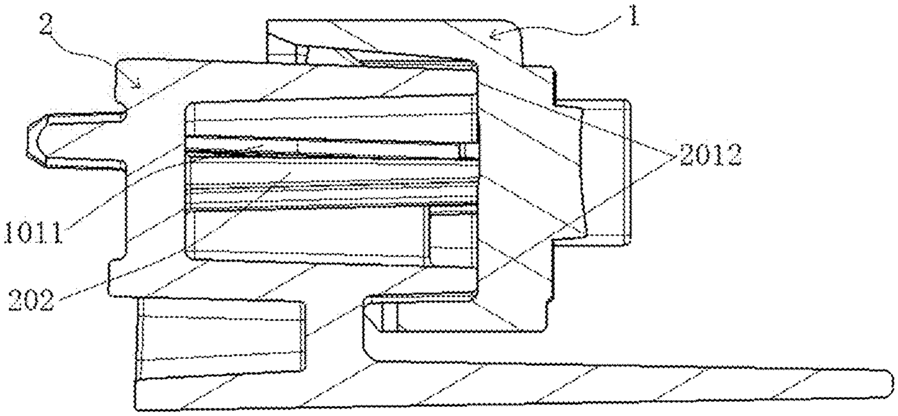
FIG. 27 is a sectional view of N-N in FIG. 26.
Figure 28:
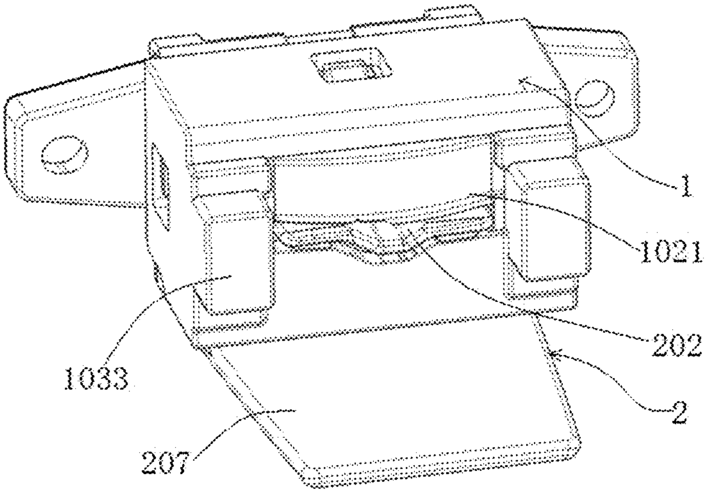
FIG. 28 is a second schematic structural diagram after mounting of the primary optical element shown in FIG. 8 and the primary optical element support shown in FIG. 11.
Figure 29:
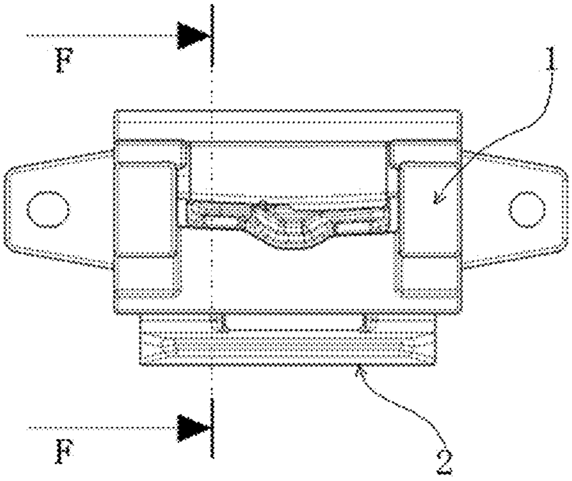
FIG. 29 is a second front view after mounting of the primary optical element shown in FIG. 8 and the primary optical element support shown in FIG. 11.
Figure 30:
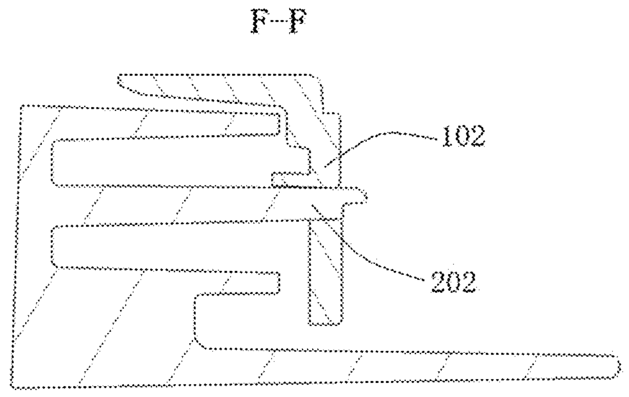
FIG. 30 is a sectional view of F-F in FIG. 29.

Based on the second preferable embodiment of the above primary optical element 1, referring to FIG. 21 and FIG. 22, a central cut-off line structure 1022 and cut-off line outer side extending structures 1026 located on two sides of the central cut-off line structure 1022 are formed at a bottom of a light-emitting surface 1021, as a second preferable embodiment of the primary optical assembly in the present disclosure, a front end surface of the supporting plate 202 is provided as an inwards-concave curved surface, outer side extending cut-off line structures 2021 are provided on two sides of a front end of a top surface of the supporting plate 202 respectively, and the outer side extending cut-off line structures 2021 are able to be connected with the central cut-off line structure 1022 so as to form a combined cut-off line structure, which replaces the cut-off line structure formed by the central cut-off line structure 1022 and the cut-off line outer side extending structures 1026. As the light-emitting surface 1021 of the primary optical element 1 is the forwards-convex curved surface, generally, the two sides of the central cut-off line structure 1022 extend outwards to form the cut-off line outer side extending structures 1026, and the central cut-off line structure 1022 and the cut-off line outer side extending structures 1026 match, so a bright and dark cut-off line b on a low-beam light shape is prone to having a phenomenon of warping and unevenness of two sides shown in FIG. 19. Thus, an outer side of the central cut-off line structure 1022 needs to be provided as a curve inwards concave from front to rear, so that the two sides of the bright and dark cut-off line b can be even, by providing the outer side extending cut-off line structures 2021 in an inwards concave curve shape at a front end of the supporting plate 202, used for supporting the fusion light-emitting portion 102 of the primary optical element 1, on the primary optical element support 2, that is, two ends of a top surface of a front end surface of the supporting plate 202 are used as the outer side extending cut-off line structures 2021, which are connected with the central cut-off line structure 1022 to form the combined cut-off line structure, and thus the bright and dark cut-off line b with the two sides being even shown in FIG. 20 is formed.

In a preferable case, an aluminum-coated layer is provided in a region, between the cut-off line outer side extending structures 1026 and the outer side extending cut-off line structures 2021, on the top surface of the supporting plate 202, so that reflectivity of light entering the region can be improved, the light entering the region continues to be propagated forwards after being reflected, and the optical efficiency is improved.

As a relative preferable specific implementation structure of the primary optical assembly in the present disclosure, the primary optical element 1 and the primary optical element support 2 are included, the primary optical element 1 includes the primary optical element main body and the primary optical element mounting portion 103 connected with the primary optical element main body, the primary optical element main body includes the light guiding portion 101 and the fusion light-emitting portion 102 provided from rear to front, a thickness of the fusion light-emitting portion 102 in an up-down direction is greater than a thickness of the light guiding portion 101 in the up-down direction, the front end surface of the fusion light-emitting portion 102 is provided as the light-emitting surface 1021, the light guiding portion 101 includes three light guiding columns sequentially arranged in a left-right direction, the three light guiding columns are two side light guiding columns 1011 and a middle light guiding column 1012, rear end surfaces of the side light guiding columns 1011 and the middle light guiding column 1012 form light-entering surfaces 1013, the outer side surface of each of the side light guiding columns 1011 is provided in such way as extending forwards along a straight line and then bending towards an outer side along a curve from rear ends of the side light guiding columns 1011 to extend to a rear side of the fusion light-emitting portion 102, a distance between a left side surface and a right side surface of the middle light guiding column 1012 increases gradually from rear to front, an included angle of 2° to 4° is formed, an angle of a light guiding column gap between the side light guiding column 1011 and the middle light guiding column 1012 is 5° to 10°, the light-emitting surface 1021 is provided as the forwards-convex curved surface and includes the main light-emitting surface 1024 and the auxiliary light-emitting surface 1025 located on the lower side of the main light-emitting surface 1024, the auxiliary light-emitting surface 1025 is provided as gradually tilting towards lower and back from top to bottom, the cut-off line structure is provided at a bottom of the auxiliary light-emitting surface 1025 and includes the central cut-off line structure 1022 and the cut-off line outer side extending structures 1026 located on the two sides of the central cut-off line structure 1022, the cut-off line outer side extending structures 1026 are smoothly connected with the central cut-off line structure 1022, a 50L dark zone forming structure 1023 is provided at a bottom of a front end of the fusion light-emitting portion 102, left and right side surfaces and a top surface of the fusion light-emitting portion 102 are connected with the primary optical element mounting portion 103, the plate insert hole 1031 is formed between a bottom surface of the fusion light-emitting portion 102 and the primary optical element mounting portion 103, the lower end of the plate insert hole 1031 is provided as the supporting plate contact surface matching a bottom surface of the supporting plate 202, and the clamp grooves 1032 matching the clamp blocks 2011 are formed in the primary optical element mounting portion 103.

The primary optical element support 2 includes the primary optical element main body containing cavity 201 used for inserted connection of the primary optical element main body and the supporting plate 202 located in the primary optical element main body containing cavity 201, a plurality of regular-prismoid-shaped through holes 203 with section perimeters decreasing gradually from front to rear are formed in the rear end of the primary optical element main body containing cavity 201, an opening of a rear end of each regular-prismoid-shaped through hole 203 is provided as a light guiding column limiting hole 2031 able to limit the light guiding column, and the number of the regular-prismoid-shaped through holes 203 is greater than or equal to the number of the light guiding columns, a sunlight focusing prevention plate 207 is provided on the primary optical element support 2, the clamp blocks 2011 are provided on an outer side of the primary optical element main body containing cavity 201, a primary optical element backwards-moving limiting surface 2012 is formed at a front end of the primary optical element main body containing cavity 201, a strengthening structure 2022 is provided at a bottom of the supporting plate 202, the front end surface of the supporting plate 202 is provided as the inwards-concave curved surface, the outer side extending cut-off line structures 2021 are provided on the two sides of the front end of the top surface of the supporting plate 202 respectively, and the aluminum-coated layer is provided in the region, between the cut-off line outer side extending structures 1026 and the outer side extending cut-off line structures 2021, on the top surface of the supporting plate 202.

A mounting process of the above primary optical assembly is: the primary optical element support 2 is connected with the primary optical element 1 in an inserted mode from a rear side of the primary optical element 1, so that the primary optical element main body containing cavity 201 is connected into an inner cavity of the primary optical element mounting portion 103 in an inserted mode from the rear side of the primary optical element 1, the primary optical element main body is mounted in the primary optical element main body containing cavity 201, the supporting plate 202 is connected into the plate insert hole 1031 in an inserted mode, the bottom surface of the supporting plate 202 is attached to the supporting plate contact surface, the top surface of the supporting plate 202 is attached to a bottom surface of the fusion light-emitting portion 102, so the outer side extending cut-off line structures 2021 and the central cut-off line structure 1022 have a connection position a of the central cut-off line structure and the outer side extending cut-off line structures so as to form the combined cut-off line structure, meanwhile, the clamp blocks 2011 are connected into the corresponding clamp grooves 1032 in a clamped mode, the primary optical element backwards-moving limiting surface 2012 is in abutting joint with the inner end surface of the primary optical element mounting portion 103, and rear ends of the side light guiding columns 1011 and the middle light guiding column 1012 are inserted from front ends of the regular-prismoid-shaped through holes 203 respectively and limited onto the light guiding column limiting holes 2031, so as to form the primary optical assembly.

Based on the above primary optical element 1, the primary optical element support 2 and the primary optical assembly formed by the both, the primary optical element 1 may be mounted in a vehicle lamp lighting device in a form of the primary optical assembly. In a preferable case, according to a requirement for miniaturization and flattening of an appearance of a vehicle lamp and a demand of the market for a small vehicle lamp lighting device, a fourth aspect of the present disclosure provides an optical assembly, referring to FIG. 31 to FIG. 41, a primary optical element 1, a primary optical element support 2, a secondary optical element 3 and a secondary optical element support 4 are mounted in an integrated mode, so a structure between parts of the vehicle lamp lighting device is more compact, and position accuracy between the parts is higher.

Figure 31:
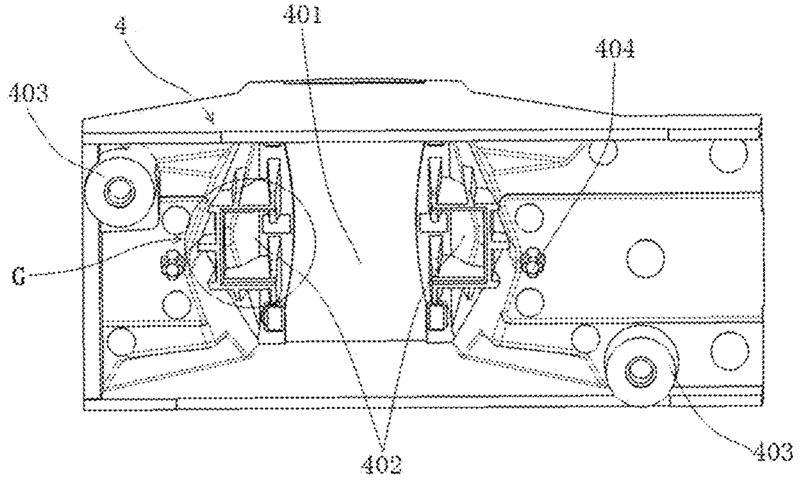
FIG. 31 is a first schematic structural diagram of a specific implementation of a secondary optical element support in the present disclosure.
Figure 32:
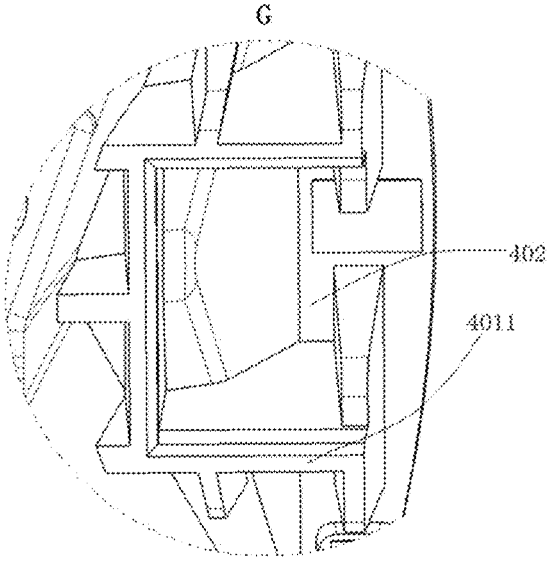
FIG. 32 is a partial enlarged view of a position G in FIG. 31.
Figure 33:
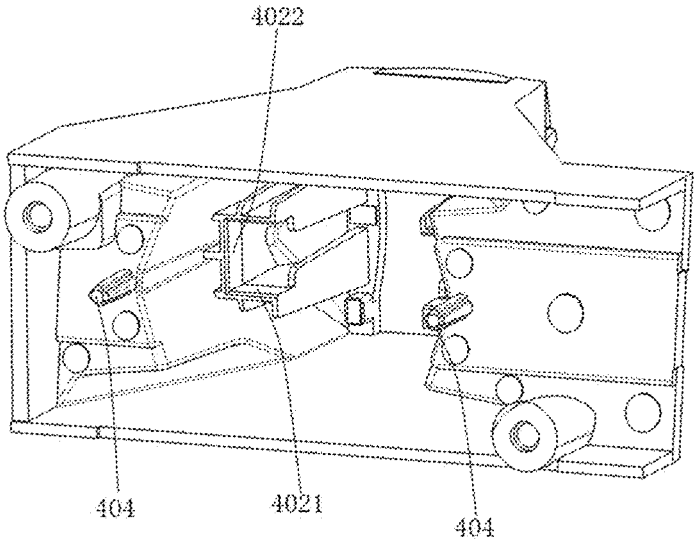
FIG. 33 is a second schematic structural diagram of the secondary optical element support shown in FIG. 31.
Figure 34:
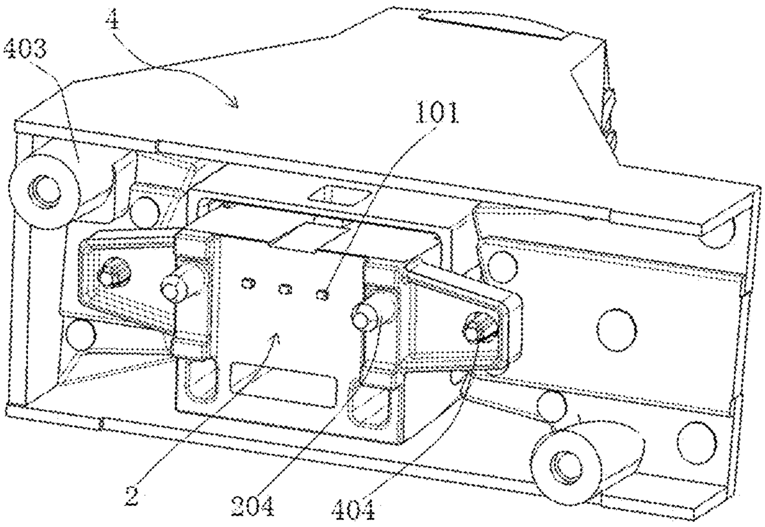
FIG. 34 is a schematic structural diagram of a specific implementation of an optical assembly in the present disclosure.
Figure 35:
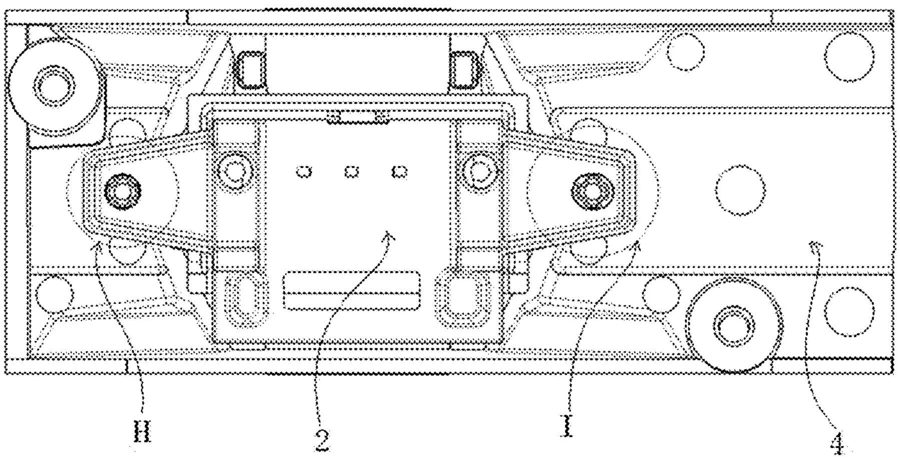
FIG. 35 is a first rear view of the optical assembly shown in FIG. 34.
Figure 36:
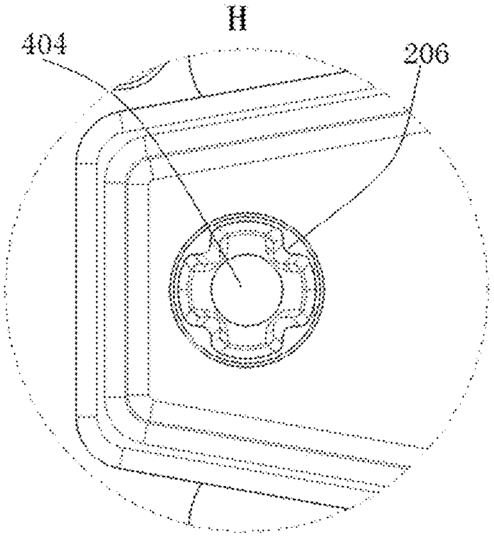
FIG. 36 is a partial enlarged view of a position H in FIG. 35.
Figure 37:
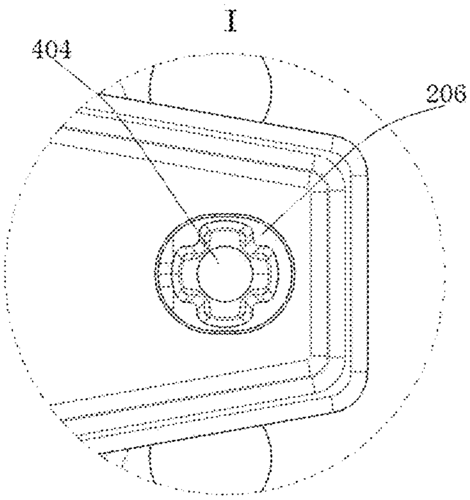
FIG. 37 is a partial enlarged view of a position I in FIG. 35.
Figure 38:
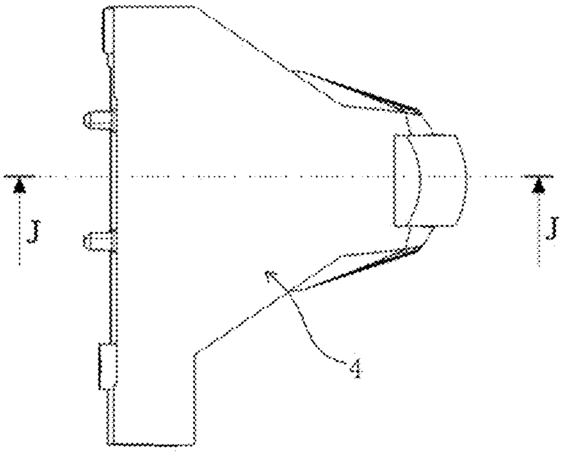
FIG. 38 is a top view of the optical assembly shown in FIG. 34
Figure 39:
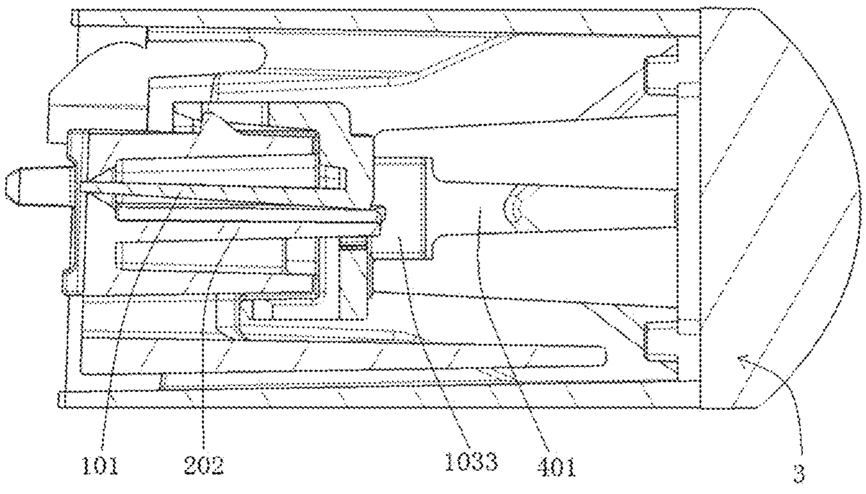
FIG. 39 is a sectional view of J-J in FIG. 38.
Figure 40:
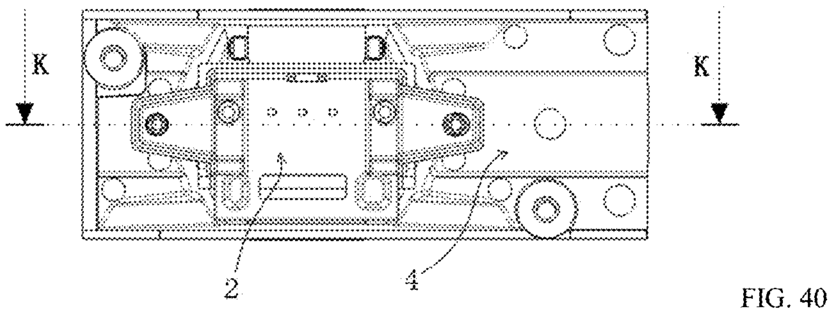
FIG. 40 is a second rear view of the optical assembly shown in FIG. 34.
Figure 41:
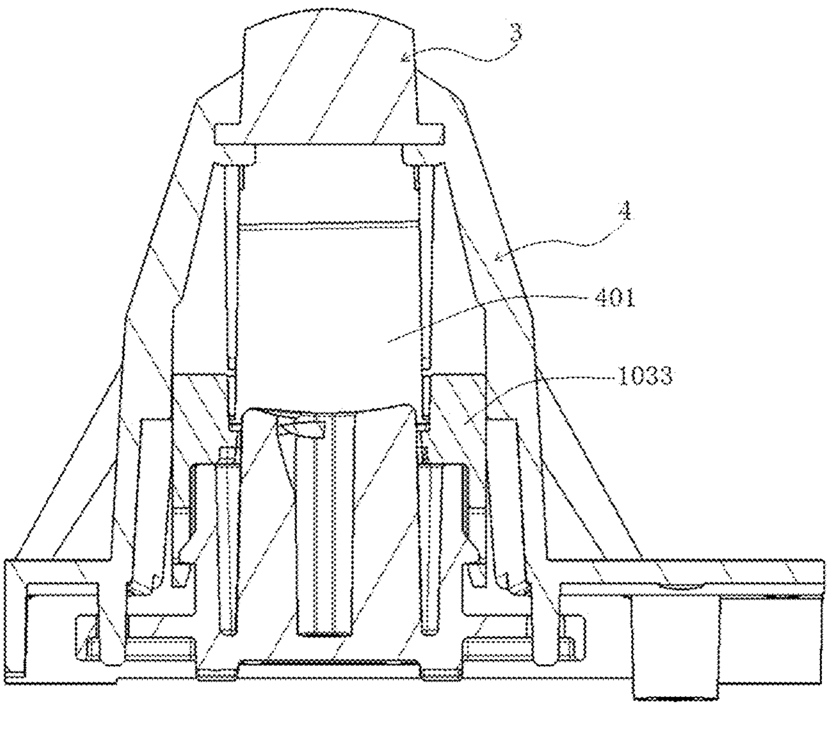
FIG. 41 is a sectional view of K-K in FIG. 40.
Figure 42:
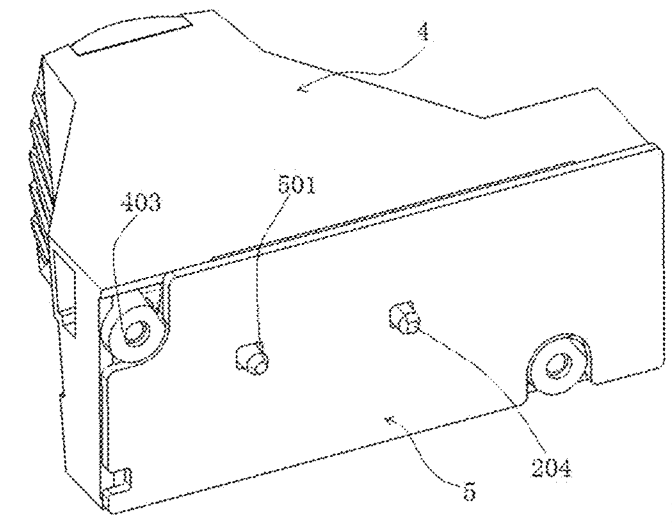
FIG. 42 is a schematic structural diagram of a first specific implementation of a vehicle lamp lighting device in the present disclosure.
Figure 43:
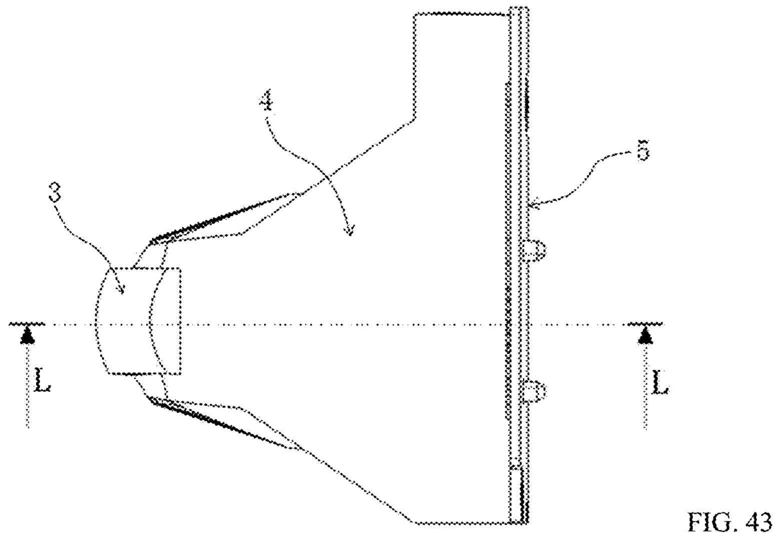
FIG. 43 is a top view of the vehicle lamp lighting device shown in FIG. 42.
Figure 44:
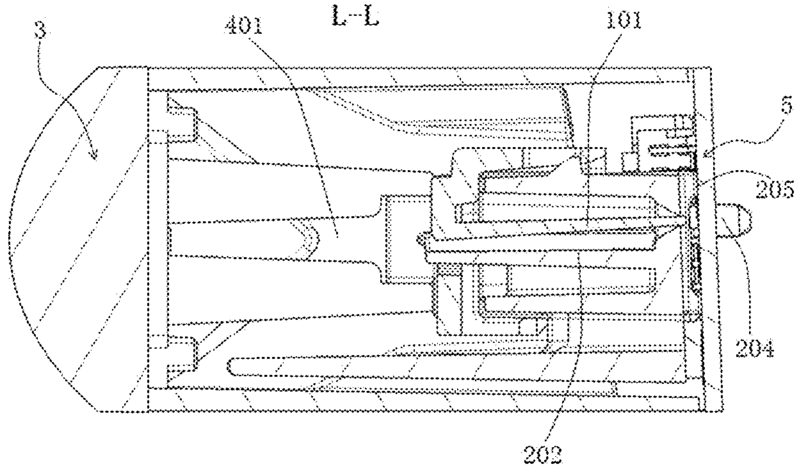
FIG. 44 is a sectional view of L-L in FIG. 43.
Figure 45:
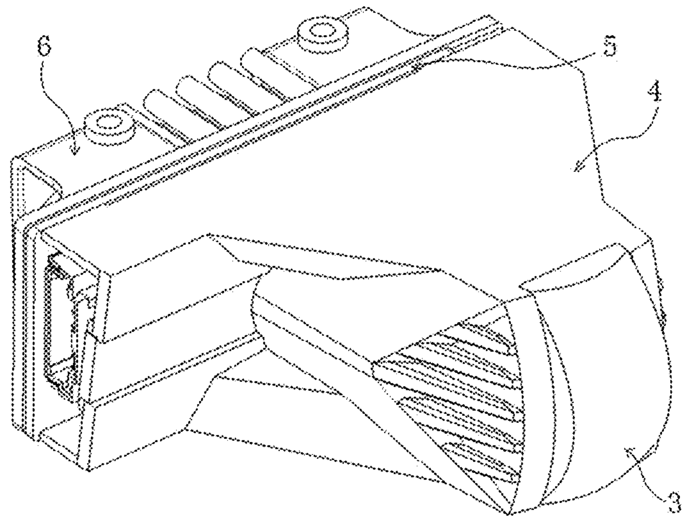
FIG. 45 is a first schematic structural diagram of a second specific implementation of a vehicle lamp lighting device in the present disclosure.
Figure 46:
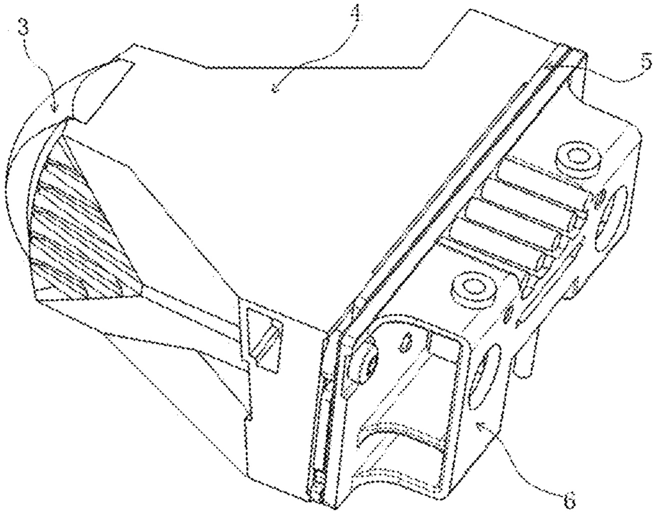
FIG. 46 is a second schematic structural diagram of the vehicle lamp lighting device shown in FIG. 45.
Figure 47:
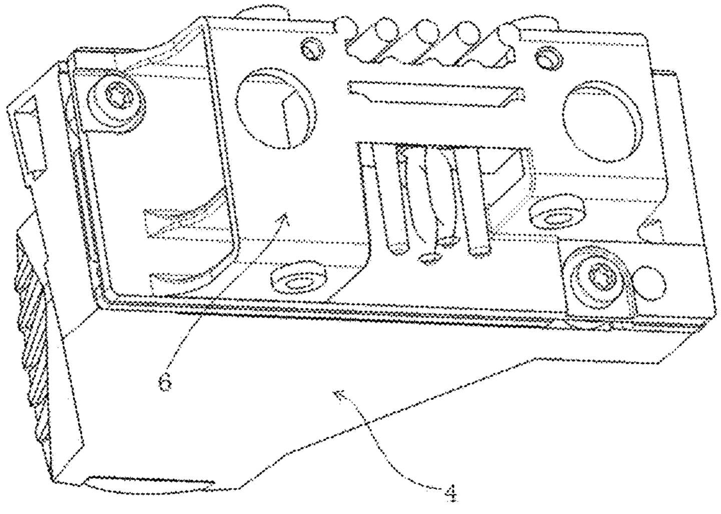
FIG. 47 is a third schematic structural diagram of the vehicle lamp lighting device shown in FIG. 45.
Figure 48:
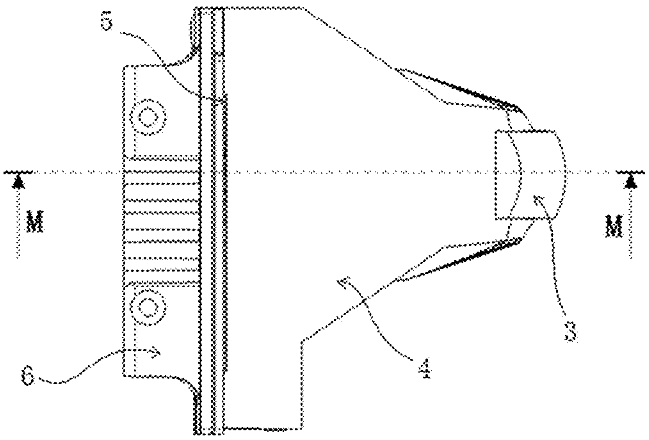
FIG. 48 is a top view of the vehicle lamp lighting device shown in FIG. 45.
Figure 49:
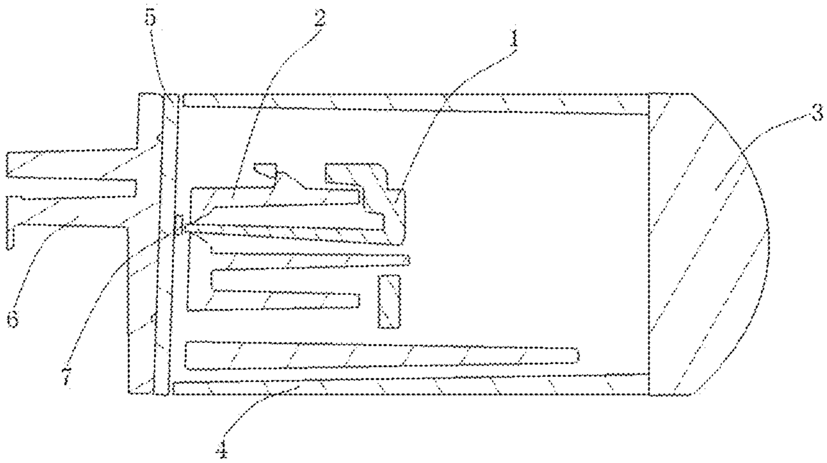
FIG. 49 is a sectional view of M-M in FIG. 48.
Figure 50:
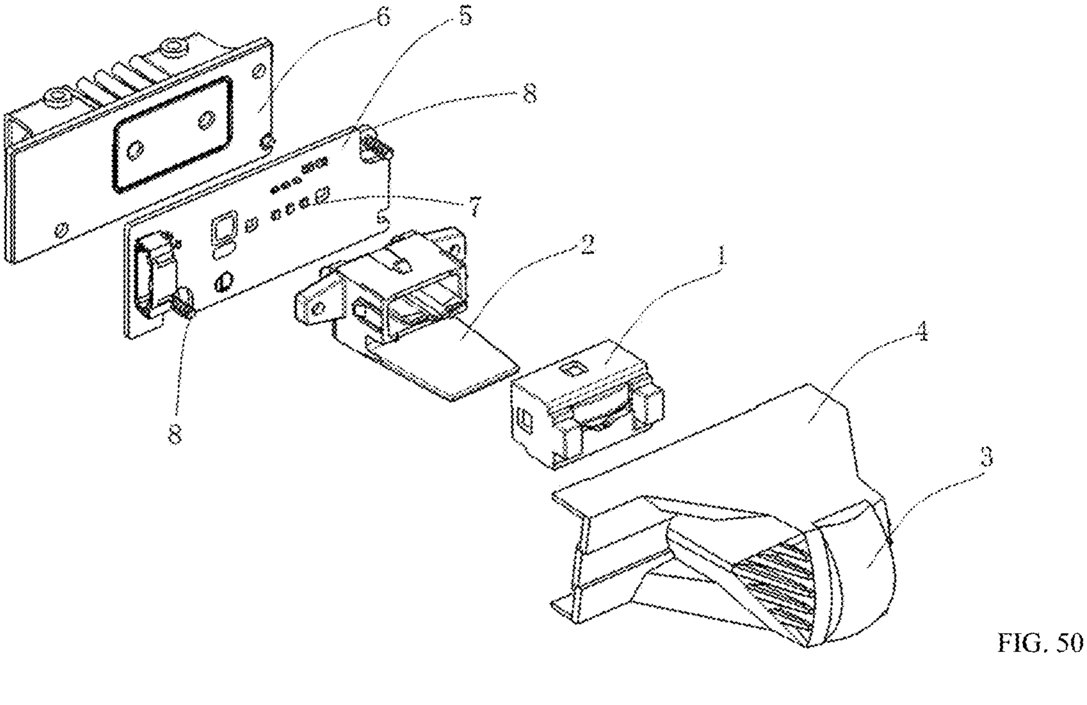
FIG. 50 is an exploded view of the vehicle lamp lighting device shown in FIG. 45.

As a first preferable embodiment of the optical assembly in the present disclosure, referring to FIG. 31 to FIG. 33, a primary optical assembly containing cavity 401 used for containing a primary optical assembly is formed in the secondary optical element support 4, the secondary optical element 3 is mounted at a front end of the primary optical assembly containing cavity 401, a locating limiting structure is provided on the primary optical element 1 and the primary optical assembly containing cavity 401, so as to limit a degree of freedom of the primary optical assembly in a case that the primary optical assembly is provided in the primary optical assembly containing cavity 401, thus connection structural stability and relative position accuracy between the primary optical assembly and the secondary optical element support are improved, then relative position accuracy between the primary optical element 1 and the secondary optical element 3 is improved, and the effect of the formed low-beam light shape is improved.

It may be understood that in the optical assembly of the present disclosure, the above mounting and connection mode of the primary optical assembly and the secondary optical element support 4 may be applied to the primary optical assembly and/or the secondary optical element support 4 of various structures, which is not limited to the structural form described in the present disclosure. The primary optical assembly is formed by inserted connection of the primary optical element support 2 and the primary optical element 1. Specifically, the optical assembly may include the primary optical element 1, the secondary optical element 3, the primary optical element support 2 used for mounting the primary optical element 1 and the secondary optical element support 4 used for mounting the secondary optical element 3, the primary optical element 1 includes the primary optical element main body, the primary optical element main body includes a light guiding portion 101 and a light-emitting portion provided from rear to front, and a front end surface of the light-emitting portion is provided as a light-emitting surface 1021; the primary optical element support 2 includes a primary optical element main body containing cavity 201, and the primary optical element support 2 is able to be connected with the primary optical element 1 in an inserted mode, so that the primary optical element main body is mounted in the primary optical element main body containing cavity 201 to form the primary optical assembly; and the primary optical assembly containing cavity 401 used for containing the primary optical assembly is provided on the secondary optical element support 4, the secondary optical element 3 is mounted at a front end of the primary optical assembly containing cavity 401, the locating limiting structure is provided on the primary optical element 1 and the primary optical assembly containing cavity 401, so as to limit the degree of freedom of the primary optical assembly in a case that the primary optical assembly is provided in the primary optical assembly containing cavity 401. At the moment, the locating limiting structure can improve the connection structural stability and the relative position accuracy between the primary optical assembly and the secondary optical element support 4, thus the relative position accuracy between the primary optical element 1 and the secondary optical element 3 is improved, and the effect of the formed low-beam light shape is improved. Thus, a preferable structural form of the following locating limiting structure is also suitable for the optical assembly.

In the present disclosure, the locating limiting structure may be any structure of mutual matching for connection limiting provided on the primary optical element 1 and the primary optical assembly containing cavity 401. In a preferable case, the locating limiting structure includes limiting cavities 402 located on the primary optical assembly containing cavity 401 and limiting blocks 1033 located on the primary optical element 1, and the limiting cavities 402 match the limiting blocks 1033. When the primary optical assembly is provided in the primary optical assembly containing cavity 401, the limiting block 1033 is connected into the corresponding limiting cavity 402 in a clamped mode. A material of a primary optical element mounting portion 103 is usually silica gel, and the limiting block 1033 is preferably provided as being a square block shape with a certain thickness, so locating of the limiting block 1033 and the limiting cavity 402 is more accurate, and if the limiting block 1033 is thin, a phenomenon of deformation is prone to occurring, which is not good for its locating and mounting. A length, a width and a thickness of the limiting block 1033 are preferably set as being greater than or equal to 2 mm, for example, may be set as the length (in an up-down direction) being about 7.5 mm, the width (in a left-right direction) being about 5 mm, and the thickness (in a front-back direction) being about 4 mm.

Specifically, referring to FIG. 8, the limiting blocks 1033 are located on a left side and a right side of the front end of the primary optical element 1, so that a limiting effect on the primary optical assembly is more balanced, and limiting and mounting accuracy of the primary optical assembly and the secondary optical element support 4 is higher. When the primary optical element 1 includes the primary optical element mounting portion 103, the limiting blocks 1033 are provided as being located on a left side and a right side of a front end of the primary optical element mounting portion 103.

Based on the limiting blocks 1033 and the limiting cavity 402, the locating limiting structure may also include the following structures: referring to FIG. 8 and FIG. 33, upper and lower end surfaces of the limiting blocks 1033 form primary optical element upper and lower limiting surfaces 1034, outer side surfaces of the limiting blocks 1033 form primary optical element left and right limiting surfaces 1035, and containing cavity upper and lower limiting surfaces 4021 corresponding to the primary optical element upper and lower limiting surfaces 1034 and containing cavity left and right limiting surfaces 4022 corresponding to the primary optical element left and right limiting surfaces 1035 are provided on an inner wall of the limiting cavity 402. The outer side surfaces of the limiting blocks 1033 specifically refer to a left side surface of the limiting block 1033 on a left side and a right side surface of the limiting block 1033 on a right side, when the primary optical assembly is mounted in the primary optical assembly containing cavity 401, and while the limiting blocks 1033 are connected into the limiting cavities 402 in an inserted mode, the primary optical element upper and lower limiting surfaces 1034 are in abutting joint with the containing cavity upper and lower limiting surfaces 4021, the primary optical element left and right limiting surfaces 1035 are in abutting joint with the containing cavity left and right limiting surfaces 4022, and thus the degree of freedom of the primary optical assembly in the up-down direction and the left-right direction is limited.

Further specifically, the locating limiting structure may also include the following structures: referring to FIG. 8 and FIG. 32, primary optical element forwards-moving limiting surfaces 1036 located on upper sides and/or lower sides of the limiting blocks 1033 are provided on the front end of the primary optical element 1, containing cavity forwards-moving limiting surfaces 4011 matching the primary optical element forwards-moving limiting surfaces 1036 are provided at a rear end of the primary optical assembly containing cavity 401, so that when the primary optical assembly is mounted in the primary optical assembly containing cavity 401, the primary optical element forwards-moving limiting surfaces 1036 are in abutting joint with the containing cavity forwards-moving limiting surfaces 4011, and thus the degree of freedom of forwards moving of the primary optical assembly is limited.

As a second preferable embodiment of the optical assembly in the present disclosure, referring to FIG. 34 to FIG. 37, guide pins 404 are provided at a rear end of the secondary optical element support 4, guide holes 206 matching the guide pins 404 are formed in the primary optical element support 2, and thus rapid guiding and pre-locating are performed when the primary optical assembly and the secondary optical element support 4 are mounted. In a preferable case, the guide holes 206 and the guide pins 404 are not attached after being mounted and have a certain gap, so that the guide holes 206 and the guide pins 404 match to play a role only in guiding and pre-locating instead of accurate locating.

As a relatively preferable specific implementation structure of the optical assembly in the present disclosure, the optical assembly includes the primary optical element 1, the primary optical element support 2 used for mounting the primary optical element 1, the secondary optical element 3 and the secondary optical element support 4 used for mounting the secondary optical element 3.

The primary optical element 1 includes a primary optical element main body and a primary optical element mounting portion 103 connected with the primary optical element main body, the primary optical element main body includes the light guiding portion 101 and the fusion light-emitting portion 102 provided from rear to front, a thickness of the fusion light-emitting portion 102 in an up-down direction is greater than a thickness of the light guiding portion in the up-down direction, a front end surface of the fusion light-emitting portion 102 is provided as a light-emitting surface 1021, the light guiding portion 101 includes three light guiding columns sequentially arranged in a left-right direction, the three light guiding columns are two side light guiding columns 1011 and a middle light guiding column 1012, rear end surfaces of the side light guiding columns 1011 and the middle light guiding column 1012 form light-entering surfaces 1013, the outer side surface of each of the side light guiding columns 1011 is provided in such way as extending forwards along a straight line and then bending towards an outer side along a curve from rear ends of the side light guiding columns 1011 to extend to a rear side of the fusion light-emitting portion 102, a distance between a left side surface and a right side surface of the middle light guiding column 1012 increases gradually from rear to front, an included angle of 2° to 4° is formed, an angle of a light guiding column gap between the side light guiding column 1011 and the middle light guiding column 1012 is 5° to 10°, the light-emitting surface 1021 is provided as a forwards-convex curved surface and includes a main light-emitting surface 1024 and an auxiliary light-emitting surface 1025 located on a lower side of the main light-emitting surface 1024, the auxiliary light-emitting surface 1025 is provided as gradually tilting towards lower and back from top to bottom, a cut-off line structure is provided at a bottom of the auxiliary light-emitting surface 1025 and includes a central cut-off line structure 1022 and cut-off line outer side extending structures 1026 located on two sides of the central cut-off line structure 1022, the cut-off line outer side extending structures 1026 are smoothly connected with the central cut-off line structure 1022, a 50L dark zone forming structure 1023 is provided at a bottom of a front end of the fusion light-emitting portion 102, left and right side surfaces and a top surface of the fusion light-emitting portion 102 are connected with the primary optical element mounting portion 103, a plate insert hole 1031 is formed between a bottom surface of the fusion light-emitting portion 102 and the primary optical element mounting portion 103, a lower end of the plate insert hole 1031 is provided as a supporting plate contact surface matching a bottom surface structure of a supporting plate 202, clamp grooves 1032 matching clamp blocks 2011 are formed in the primary optical element mounting portion 103, the limiting blocks 1033 are provided on a left side and a right side of the front end of the primary optical element mounting portion 103, the upper and lower end surfaces of the limiting blocks 1033 form the primary optical element upper and lower limiting surfaces 1034, the outer side surfaces of the limiting blocks 1033 form the primary optical element left and right limiting surfaces 1035, and the primary optical element forwards-moving limiting surfaces 1036 are provided on the upper sides and the lower sides of the limiting blocks 1033 respectively.

The primary optical element support 2 includes the primary optical element main body containing cavity 201 used for inserted connection of the primary optical element main body and the supporting plate 202 located in the primary optical element main body containing cavity 201, a plurality of regular-prismoid-shaped through holes 203 with section perimeters decreasing gradually from front to rear are formed in the rear end of the primary optical element main body containing cavity 201, an opening of a rear end of each regular-prismoid-shaped through hole 203 is provided as a light guiding column limiting hole 2031 able to limit the light guiding column, and the number of the regular-prismoid-shaped through holes 203 is greater than or equal to the number of the light guiding columns, a sunlight focusing prevention plate 207 is provided on the primary optical element support 2, the clamp blocks 2011 are provided on an outer side of the primary optical element main body containing cavity 201, a primary optical element backwards-moving limiting surface 2012 is formed at a front end of the primary optical element main body containing cavity 201, a strengthening structure 2022 is provided at a bottom of the supporting plate 202, a front end surface of the supporting plate 202 is provided as the inwards-concave curved surface, outer side extending cut-off line structures 2021 are provided on two sides of a front end of a top surface of the supporting plate 202 respectively, an aluminum-coated layer is provided in the region, between the cut-off line outer side extending structures 1026 and the outer side extending cut-off line structures 2021, on the top surface of the supporting plate 202, and the guide holes 206 are formed in a left side and a right side of the primary optical element support 2 respectively.

The primary optical assembly containing cavity 401 used for containing the primary optical assembly is formed in the secondary optical element support 4, the secondary optical element 3 is mounted at the front end of the primary optical assembly containing cavity 401, the limiting cavities 402 are formed in the rear end of the primary optical assembly containing cavity 401, the containing cavity upper and lower limiting surfaces 4021 corresponding to the primary optical element upper and lower limiting surfaces 1034 and the containing cavity left and right limiting surfaces 4022 corresponding to the primary optical element left and right limiting surfaces 1035 are provided on the inner walls of the limiting cavities 402, the containing cavity forwards-moving limiting surfaces 4011 matching the primary optical element forwards-moving limiting surfaces 1036 are provided on the rear end surface of the primary optical assembly containing cavity 401, and the guide pins 404 matching the guide holes 206 are provided at the rear end of the secondary optical element support 4.

A mounting process of the above provided optical assembly is:

first step, the primary optical element support 2 is connected with the primary optical element 1 in an inserted mode from a rear side of the primary optical element 1, so that the primary optical element main body containing cavity 201 is connected into an inner cavity of the primary optical element mounting portion 103 in an inserted mode from the rear side of the primary optical element 1, the primary optical element main body is mounted in the primary optical element main body containing cavity 201, the supporting plate 202 is connected into the plate insert hole 1031 in an inserted mode, the bottom surface of the supporting plate 202 is attached to the supporting plate contact surface, the top surface of the supporting plate 202 is attached to a bottom surface of the fusion light-emitting portion 102, so the outer side extending cut-off line structures 2021 and the central cut-off line structure 1022 have a connection position a of the central cut-off line structure and the outer side extending cut-off line structures, so as to form the combined cut-off line structure, meanwhile, the clamp blocks 2011 are connected into the corresponding clamp grooves 1032 in a clamped mode, the primary optical element backwards-moving limiting surface 2012 is in abutting joint with an inner end surface of the primary optical element mounting portion 103, and rear ends of the side light guiding columns 1011 and the middle light guiding column 1012 are inserted from front ends of the corresponding regular-prismoid-shaped through holes 203 respectively and limited onto the light guiding column limiting holes 2031, so as to form the primary optical assembly.

Second step, the primary optical assembly is connected into the primary optical assembly containing cavity 401 in an inserted mode from the rear end of the secondary optical element support 4, so the limiting blocks 1033 are connected into the corresponding limiting cavities 402 in an inserted mode, the primary optical element upper and lower limiting surfaces 1034 are attached to the corresponding containing cavity upper and lower limiting surfaces 4021, the primary optical element left and right limiting surfaces 1035 are attached to the corresponding containing cavity left and right limiting surfaces 4022, the primary optical element forwards-moving limiting surfaces 1036 are attached to the corresponding containing cavity forwards-moving limiting surfaces 4011, meanwhile, the guide pins 404 are inserted into the corresponding guide holes 206, and then the secondary optical element 3 is mounted at the front end of the primary optical assembly containing cavity 401, so as to form the optical assembly.

A fifth aspect of the present disclosure provides a vehicle lamp lighting device, including low-beam light sources 7 and the optical assembly described in any above technical solution. The low-beam light sources 7, the primary optical element 1 and the secondary optical element 3 are sequentially arranged from rear to front. Generally, the low-beam light sources 7 and the light guiding columns are in one-to-one correspondence.

As a first preferable embodiment of the vehicle lamp lighting device in the present disclosure, referring to FIG. 42 to FIG. 50, the vehicle lamp lighting device further includes a circuit board 5, the low-beam light sources 7 are provided on the circuit board 5, locating pins 204 and a circuit board abutting-joint surface 205 able to make contact with the circuit board 5 are provided on a rear end of the primary optical element support 2, and locating holes 501 matching the locating pins 204 are formed in the circuit board 5. At least one circuit board abutting-joint surface 205 is provided, preferably, the circuit board abutting-joint surfaces are provided at four corners of the rear end of a primary optical element support 2 respectively, namely, a total of four circuit board abutting-joint surfaces 205 are provided, so that when the optical assembly is connected with the circuit board 5, the circuit board 5 abuts against the circuit board abutting-joint surfaces 205 of the primary optical element support 2 in balance, a degree of freedom of backwards moving of the primary optical assembly is limited, meanwhile, the locating pins 204 are inserted into the locating holes 501 for rapidly locating the circuit board 5, and meanwhile position accuracy between the low-beam light sources 7 and a light-entering surface 1013 of the primary optical element 1 is further guaranteed.

As a second preferable embodiment of the vehicle lamp lighting device in the present disclosure, referring to FIG. 42 to FIG. 47, the vehicle lamp lighting device further includes a heat sink 6, the heat sink 6 is provided on a rear side of the circuit board 5, studs 403 are provided at a rear end of the secondary optical element support 4, screw holes matching the studs 403 are formed in the heat sink 6, screws 8 penetrate through the screw holes in the heat sink 6 to be in threaded connection with the studs 403, that is, the heat sink 6 is tightened onto the secondary optical element support 4 through the screws 8, so as to fixedly press the circuit board 5. In a preferable case, the studs 403 are provided at diagonal corners of the rear end of the secondary optical element support 4, so that a connection structure of all parts in the vehicle lamp lighting device is firmer.

Structures and mounting processes of the various parts such as the primary optical element 1, the primary optical element support 2, the secondary optical element 3 and the secondary optical element support 4 of the present disclosure are introduced below through a relatively preferable specific implementation structure of the vehicle lamp lighting device. The vehicle lamp lighting device includes the primary optical element 1, the primary optical element support 2 used for mounting the primary optical element 1, the secondary optical element 3 and the secondary optical element support 4 used for mounting the secondary optical element 3, and the circuit board 5 and the heat sink 6 are sequentially provided on a rear side of the primary optical element 1, and the low-beam light sources 7 are mounted on the circuit board 5.

The primary optical element 1 includes a primary optical element main body and a primary optical element mounting portion 103 connected with the primary optical element main body, the primary optical element main body includes a light guiding portion 101 and a fusion light-emitting portion 102 provided from rear to front, a thickness of the fusion light-emitting portion 102 in an up-down direction is greater than a thickness of the light guiding portion 101 in the up-down direction, a front end surface of the fusion light-emitting portion 102 is provided as a light-emitting surface 1021, the light guiding portion 101 includes three light guiding columns sequentially arranged in a left-right direction, the three light guiding columns are two side light guiding columns 1011 and a middle light guiding column 1012, rear end surfaces of the side light guiding columns 1011 and the middle light guiding column 1012 form light-entering surfaces 1013, the outer side surface of each of the side light guiding columns 1011 is provided in such way as extending forwards along a straight line and then bending towards an outer side along a curve from rear ends of the side light guiding columns 1011 to extend to a rear side of the fusion light-emitting portion 102, a distance between a left side surface and a right side surface of the middle light guiding column 1012 increases gradually from rear to front, an included angle of 2° to 4° is formed, an angle of a light guiding column gap between the side light guiding column 1011 and the middle light guiding column 1012 is 5° to 10°, the light-emitting surface 1021 is provided as a forwards-convex curved surface and includes a main light-emitting surface 1024 and an auxiliary light-emitting surface 1025 located on a lower side of the main light-emitting surface 1024, the auxiliary light-emitting surface 1025 is provided as gradually tilting towards lower and back from top to bottom, a cut-off line structure is provided at a bottom of the auxiliary light-emitting surface 1025 and includes a central cut-off line structure 1022 and cut-off line outer side extending structures 1026 located on two sides of the central cut-off line structure 1022, the cut-off line outer side extending structures 1026 are smoothly connected with the central cut-off line structure 1022, a 50L dark zone forming structure 1023 is provided at a bottom of a front end of the fusion light-emitting portion 102, left and right side surfaces and a top surface of the fusion light-emitting portion 102 are connected with the primary optical element mounting portion 103, a plate insert hole 1031 is formed between a bottom surface of the fusion light-emitting portion 102 and the primary optical element mounting portion 103, a lower end of the plate insert hole 1031 is provided as a supporting plate contact surface matching a bottom surface structure of a supporting plate 202, clamp grooves 1032 matching clamp blocks 2011 are formed in the primary optical element mounting portion 103, the limiting blocks 1033 are provided on a left side and a right side of a front end of the primary optical element mounting portion 103, upper and lower end surfaces of the limiting blocks 1033 form primary optical element upper and lower limiting surfaces 1034, outer side surfaces of the limiting blocks 1033 form primary optical element left and right limiting surfaces 1035, and primary optical element forwards-moving limiting surfaces 1036 are provided on upper sides and lower sides of the limiting blocks 1033 respectively.

The primary optical element support 2 includes a primary optical element main body containing cavity 201 used for inserted connection of the primary optical element main body and the supporting plate 202 located in the primary optical element main body containing cavity 201, a plurality of regular-prismoid-shaped through holes 203 with section perimeters decreasing gradually from front to rear are formed in a rear end of the primary optical element main body containing cavity 201, an opening of a rear end of each regular-prismoid-shaped through hole 203 is provided as a light guiding column limiting hole 2031 able to limit the light guiding column, and the number of the regular-prismoid-shaped through holes 203 is greater than or equal to the number of the light guiding columns, a sunlight focusing prevention plate 207 is provided on the primary optical element support 2, clamp blocks 2011 are provided on an outer side of the primary optical element main body containing cavity 201, a primary optical element backwards-moving limiting surface 2012 is formed at a front end of the primary optical element main body containing cavity 201, a strengthening structure 2022 is provided at a bottom of the supporting plate 202, a front end surface of the supporting plate 202 is provided as an inwards-concave curved surface, outer side extending cut-off line structures 2021 are provided on two sides of a front end of a top surface of the supporting plate 202 respectively, the aluminum-coated layer is provided in a region, between the cut-off line outer side extending structures 1026 and the outer side extending cut-off line structures 2021, on the top surface of the supporting plate 202, guide holes 206 are formed in a left side and a right side of the primary optical element support 2 respectively, locating pins 204 are provided at a rear end of the primary optical element support 2, and the circuit board abutting-joint surfaces 205 are located at the four corners of the rear end of the primary optical element support 2.

A primary optical assembly containing cavity 401 used for containing a primary optical assembly is formed in the secondary optical element support 4, the secondary optical element 3 is mounted at a front end of the primary optical assembly containing cavity 401, limiting cavities 402 are formed in a rear end of the primary optical assembly containing cavity 401, containing cavity upper and lower limiting surfaces 4021 corresponding to the primary optical element upper and lower limiting surfaces 1034 and containing cavity left and right limiting surfaces 4022 corresponding to the primary optical element left and right limiting surfaces 1035 are provided on inner walls of the limiting cavities 402, containing cavity forwards-moving limiting surfaces 4011 matching the primary optical element forwards-moving limiting surfaces 1036 are provided on a rear end surface of the primary optical assembly containing cavity 401, and the studs 403 at the diagonal corners and guide pins 404 matching guide holes 206 are provided at the rear end of the secondary optical element support 4.

The locating holes 501 matching the locating pins 204 are formed in the circuit board 5.

The screw holes matching the studs 403 are formed in the heat sink 6.

A mounting process of a specific implementation of the above provided vehicle lamp lighting device is:

first step, the primary optical element support 2 is connected with the primary optical element 1 in an inserted mode from a rear side of the primary optical element 1, so that the primary optical element main body containing cavity 201 is connected into an inner cavity of the primary optical element mounting portion 103 in an inserted mode from the rear side of the primary optical element 1, the primary optical element main body is mounted in the primary optical element main body containing cavity 201, the supporting plate 202 is connected into the plate insert hole 1031 in an inserted mode, the bottom surface of the supporting plate 202 is attached to the supporting plate contact surface, the top surface of the supporting plate 202 is attached to a bottom surface of the fusion light-emitting portion 102, so the outer side extending cut-off line structures 2021 and the central cut-off line structure 1022 have a connection position a of the central cut-off line structure and the outer side extending cut-off line structures, so as to form the combined cut-off line structure, meanwhile, the clamp blocks 2011 are connected into the corresponding clamp grooves 1032 in a clamped mode, the primary optical element backwards-moving limiting surface 2012 is in abutting joint with an inner end surface of the primary optical element mounting portion 103, and rear ends of the side light guiding columns 1011 and the middle light guiding column 1012 are inserted from front ends of the corresponding regular-prismoid-shaped through holes 203 respectively and limited onto the light guiding column limiting holes 2031, so as to form the primary optical assembly.

Second step, the primary optical assembly is connected into the primary optical assembly containing cavity 401 in an inserted mode from the rear end of the secondary optical element support 4, so the limiting blocks 1033 are connected into the corresponding limiting cavities 402 in an inserted mode, the primary optical element upper and lower limiting surfaces 1034 are attached to the corresponding containing cavity upper and lower limiting surfaces 4021, the primary optical element left and right limiting surfaces 1035 are attached to the corresponding containing cavity left and right limiting surfaces 4022, the primary optical element forwards-moving limiting surfaces 1036 are attached to the corresponding containing cavity forwards-moving limiting surfaces 4011, meanwhile, the guide pins 404 are inserted into the corresponding guide holes 206, and then the secondary optical element 3 is mounted at the front end of the primary optical assembly containing cavity 401, so as to form the optical assembly.

Third step, the low-beam light sources 7 are mounted on the circuit board 5, the circuit board 5 is connected with a rear end of the optical assembly, that is, the locating pins 204 are connected into the corresponding locating holes 501 in an inserted mode, so that the circuit board 5 is attached to and in abutting joint with the circuit board abutting-joint surface 205, then the screws 8 penetrate through the screw holes in the heat sink 6 and are inserted into the studs 403 to be tightened, the heat sink 6 and the secondary optical element support 4 are fixed, and the circuit board 5 is tightened, so mounting of the vehicle lamp lighting device is completed.

The above vehicle lamp lighting device can be designed as a largest size of a length, a width and a height of the vehicle lamp lighting device being smaller than or equal to 130 mm, preferably, being smaller than or equal to 100 mm, further, a smaller size of a length and a width of a light-emitting surface of the secondary optical element 3 or an optical element in another light-emitting form may be designed as being smaller than or equal to 20 mm, preferably, being smaller than or equal to 10 mm.

The primary optical element 1, the primary optical element support 2, the primary optical assembly, the optical assembly and the vehicle lamp lighting device provided by any above technical solution in the present disclosure can not only be applied to a small vehicle lamp lighting device, but also be applied to a larger-size vehicle lamp lighting device.

A sixth aspect of the present disclosure provides a vehicle, including the vehicle lamp lighting device described in any above technical solution. Thus, all beneficial effects brought by the technical solutions of the embodiments of the above primary optical element, the primary optical assembly, the optical assembly and the vehicle lamp lighting device are at least achieved.

It may be seen from the above description that through the above technical solutions, the light guiding portion 101 of the primary optical element 1 provided by the present disclosure is provided as the plurality of light guiding columns arranged sequentially in the left-right direction, and the thickness of the fusion light-emitting portion 102 in the up-down direction is greater than the thickness of the light guiding portion 101 in the up-down direction; as the thickness of the fusion light-emitting portion 102 is increased, not only can light transmitted by each light guiding column to the fusion light-emitting portion 102 be fused in the fusion light-emitting portion 102 so that light transmitted to the light-emitting surface 1021 is uniformly distributed, but also the light emitted from the light-emitting surface 1021 can be more diffused, so it is beneficial for light shape softening of the lower portion of the upper boundary of the low-beam light shape, and thus the primary optical element 1 is high in optical efficiency, and enables the formed low-beam light shape to have a good effect.

In preferable implementations of the present disclosure, the outer side surface of each of the side light guiding columns 1011 is provided in such way as extending forwards along the straight line and then bending towards the outer side along the curve from the rear ends to extend to the rear side of the fusion light-emitting portion 102, and outer side outlines of the side light guiding columns 1011 gradually bend towards two sides, so that the lighting range of the two sides of the low-beam light shape can be widened; the primary optical element 1 and the primary optical element support 2 are connected in an inserted mode to form the primary optical assembly, so that the structural stability during mounting and use of the primary optical element 1 and the formed light shape stability can be improved, and the structure between the parts in the vehicle lamp lighting device is more compact and the position accuracy between the parts is higher; the locating limiting structure is provided on the primary optical element 1 and the primary optical assembly containing cavity 401, connection structural stability and relative position accuracy between the primary optical assembly and the secondary optical element support 4 can be improved, thus relative position accuracy between the primary optical element 1 and the secondary optical element 3 is improved, and the effect of the formed low-beam light shape is improved.

The preferable implementations of the present disclosure are described in detail above with reference to the accompanying drawings, but the present disclosure is not limited to this. Within the technical concept of the present disclosure, various simple variations may be made to the technical solutions of the present disclosure, which include combining various specific technical features in any appropriate mode, and in order to avoid unnecessary repetition, the present disclosure does not make extra description for various possible combination modes. However, these simple variations and combinations are also regarded as contents disclosed by the present disclosure and fall within the protection scope of the present disclosure.

The invention claimed is:

1. A primary optical element, comprising a primary optical element main body, wherein the primary optical element main body comprises a light guiding portion and a fusion light-emitting portion which are provided from rear to front, a front end surface of the fusion light-emitting portion is provided as a light-emitting surface, the light guiding portion comprises a plurality of light guiding columns sequentially arranged in a left-right direction, a thickness of the fusion light-emitting portion in an up-down direction is greater than a thickness of the light guiding portion in the up-down direction, and the fusion light-emitting portion is able to fuse light transmitted by the plurality of light guiding columns to the fusion light-emitting portion, and then emit the light by means of the light-emitting surface, a cut-off line structure is formed at a bottom of the light-emitting surface.

2. The primary optical element according to claim 1, wherein the plurality of light guiding columns comprise two side light guiding columns and at least one middle light guiding column, the at least one middle light guiding column is sequentially arranged between the two side light guiding columns in the left-right direction, and an outer side surface of each of the side light guiding columns is provided in such way as extending forwards along a straight line and then bending towards an outer side along a curve from rear ends of the side light guiding columns to extend to a rear side of the fusion light-emitting portion.

3. The primary optical element according to claim 2, wherein the middle light guiding column is provided in such way as making a distance between a left side surface and a right side surface increase gradually from rear to front.

4. The primary optical element according to claim 3, wherein an included angle formed between the left side surface and the right side surface of the middle light guiding column is 2° to 4°, and an included angle of a gap between the side light guiding column and the middle light guiding column adjacent to the side light guiding column is 5° to 10°.

5. The primary optical element according to claim 1, wherein the light-emitting surface is provided as a forwards-convex curved surface;

and the cut-off line structure comprises a central cut-off line structure and cut-off line outer side extending structures located on two sides of the central cut-off line structure, and the cut-off line outer side extending structures are smoothly connected with the central cut-off line structure.

6. The primary optical element according to claim 5, wherein the light-emitting surface comprises a main light-emitting surface and an auxiliary light-emitting surface located on a lower side of the main light-emitting surface, the auxiliary light-emitting surface is provided in such way as gradually tilting towards lower and back from top to bottom, and the cut-off line structure is provided on the auxiliary light-emitting surface;

and a transitional surface is provided between the main light-emitting surface and the auxiliary light-emitting surface, and the transitional surface is provided as an arc surface so as to smoothly connect the main light-emitting surface and the auxiliary light-emitting surface.

7. A primary optical assembly, comprising the primary optical element according to claim 1 and a primary optical element support used for mounting the primary optical element.

8. The primary optical assembly according to claim 7, wherein the primary optical element support comprises a primary optical element main body containing cavity, and the primary optical element support is able to be connected with the primary optical element in an inserted mode, so that a primary optical element main body is mounted in the primary optical element main body containing cavity.

9. The primary optical assembly according to claim 8, wherein the primary optical element further comprises a primary optical element mounting portion connected with the primary optical element main body, left and right side surfaces and a top surface of a fusion light-emitting portion are connected with the primary optical element mounting portion, a plate insert hole is formed between a bottom surface of the fusion light-emitting portion and the primary optical element mounting portion, a supporting plate is provided in the primary optical element main body containing cavity, so that in a state that the primary optical element main body is mounted in the primary optical element main body containing cavity, the supporting plate is able to be connected into the plate insert hole in an inserted mode and the fusion light-emitting portion is supported on the supporting plate.

10. The primary optical assembly according to claim 9, wherein (1) clamp blocks are arranged on an outer side of the primary optical element main body containing cavity, and clamp grooves matching the clamp blocks are formed in the primary optical element mounting portion; or (2) a strengthening structure is provided at a bottom of the supporting plate; or (3) a sunlight focusing prevention plate is provided on the primary optical element support; or (4) clamp blocks are arranged on an outer side of the primary optical element main body containing cavity, and clamp grooves matching the clamp blocks are formed in the primary optical element mounting portion, and a strengthening structure is provided at a bottom of the supporting plate; or (5) clamp blocks are arranged on an outer side of the primary optical element main body containing cavity, and clamp grooves matching the clamp blocks are formed in the primary optical element mounting portion, and a sunlight focusing prevention plate is provided on the primary optical element support; or (6) a strengthening structure is provided at a bottom of the supporting plate and a sunlight focusing prevention plate is provided on the primary optical element support; or (7) clamp blocks are arranged on an outer side of the primary optical element main body containing cavity, and clamp grooves matching the clamp blocks are formed in the primary optical element mounting portion, and a strengthening structure is provided at a bottom of the supporting plate, and a sunlight focusing prevention plate is provided on the primary optical element support.

11. The primary optical assembly according to claim 9, wherein a light-emitting surface is provided as a forwards-convex curved surface, a cut-off line structure is formed at a bottom of the light-emitting surface and comprises a central cut-off line structure and cut-off line structure outer side extending structures located on two sides of the central cut-off line structure, and the cut-off line structure outer side extending structures are smoothly connected with the central cut-off line structure; and a front end surface of the supporting plate is provided as an inwards-concave curved surface, outer side extending cut-off line structures are provided on two sides of a front end of a top surface of the supporting plate respectively, and the outer side extending cut-off line structures are able to be connected with the cut-off line structure so as to form a combined cut-off line structure.

12. The primary optical assembly according to claim 11, wherein an aluminum-coated layer is provided in a region, between the cut-off line outer side extending structures and the outer side extending cut-off line structures, on the top surface of the supporting plate.

13. The primary optical assembly according to claim 8, wherein a plurality of regular-prismoid-shaped through holes with section perimeters decreasing gradually from front to rear are formed in a rear end of the primary optical element main body containing cavity, an opening of a rear end of each regular-prismoid-shaped through hole is provided as a light guiding column limiting hole able to limit a light guiding column, and the number of the regular-prismoid-shaped through holes is greater than or equal to the number of the light guiding columns.

14. An optical assembly, comprising the primary optical assembly according to claim 7, a secondary optical element and a secondary optical element support used for mounting the secondary optical element.

15. The optical assembly according to claim 14, wherein a primary optical element support comprises a primary optical element main body containing cavity, and the primary optical element support is able to be connected with a primary optical element in an inserted mode, so that a primary optical element main body is mounted in the primary optical element main body containing cavity to form the primary optical assembly; and a primary optical assembly containing cavity used for containing the primary optical assembly is provided on the secondary optical element support, the secondary optical element is mounted at a front end of the primary optical assembly containing cavity, a locating limiting structure is provided on the primary optical element and the primary optical assembly containing cavity, so as to limit a degree of freedom of the primary optical assembly in a case that the primary optical assembly is provided in the primary optical assembly containing cavity.

16. The optical assembly according to claim 15, wherein the locating limiting structure comprises limiting cavities located on the primary optical assembly containing cavity and limiting blocks located on the primary optical element, and the limiting cavities match the limiting blocks.

17. The optical assembly according to claim 16, wherein (1) upper and lower end surfaces of the limiting blocks form primary optical element upper and lower limiting surfaces, outer side surfaces of the limiting blocks form primary optical element left and right limiting surfaces, and containing cavity upper and lower limiting surfaces corresponding to the primary optical element upper and lower limiting surfaces and containing cavity left and right limiting surfaces corresponding to the primary optical element left and right limiting surfaces are provided on inner walls of the limiting cavities; or (2) primary optical element forwards-moving limiting surfaces located on upper sides and/or lower sides of the limiting blocks are provided on the front end of the primary optical element, and containing cavity forwards-moving limiting surfaces matching the primary optical element forwards-moving limiting surfaces are provided at a rear end of the primary optical assembly containing cavity; or (3) upper and lower end surfaces of the limiting blocks form primary optical element upper and lower limiting surfaces, outer side surfaces of the limiting blocks form primary optical element left and right limiting surfaces, and containing cavity upper and lower limiting surfaces corresponding to the primary optical element upper and lower limiting surfaces and containing cavity left and right limiting surfaces corresponding to the primary optical element left and right limiting surfaces are provided on inner walls of the limiting cavities, and primary optical element forwards-moving limiting surfaces located on upper sides and/or lower sides of the limiting blocks are provided on the front end of the primary optical element, and containing cavity forwards-moving limiting surfaces matching the primary optical element forwards-moving limiting surfaces are provided at a rear end of the primary optical assembly containing cavity.

18. The optical assembly according to claim 16, wherein the primary optical element further comprises a primary optical element mounting portion connected with the primary optical element main body, and the limiting blocks are located at a front end of the primary optical element mounting portion.

19. The optical assembly according to claim 14, wherein a guide pin is provided at a rear end of the secondary optical element support, and a guide hole matching the guide pin is formed in the primary optical element support.

20. A vehicle lamp lighting device, comprising a low-beam light source, a circuit board and the optical assembly according to claim 14, wherein the low-beam light source, a primary optical element and a secondary optical element are arranged sequentially from rear to front; the low-beam light source is provided on the circuit board, locating pins and circuit board abutting-joint surfaces able to make contact with the circuit board are provided at a rear end of a primary optical element support, and locating holes matching the locating pins are formed in the circuit board.

* * * * *